(12) United States Patent
Mai et al.

(10) Patent No.: US 12,482,814 B2
(45) Date of Patent: Nov. 25, 2025

(54) ELECTRODE MATERIALS, AND METHODS OF MANUFACTURING AND USE THEREOF

(71) Applicant: JINAN UNIVERSITY, Guangzhou (CN)

(72) Inventors: Yaohua Mai, Guangzhou (CN); Shuaibo Zeng, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 718 days.

(21) Appl. No.: 17/778,527

(22) PCT Filed: Oct. 20, 2020

(86) PCT No.: PCT/CN2020/122193
§ 371 (c)(1),
(2) Date: May 20, 2022

(87) PCT Pub. No.: WO2021/098435
PCT Pub. Date: May 27, 2021

(65) Prior Publication Data
US 2022/0416230 A1    Dec. 29, 2022

(30) Foreign Application Priority Data

Nov. 21, 2019  (CN) .......................... 201911148246.2

(51) Int. Cl.
*H01M 4/36* (2006.01)
*C01B 32/156* (2017.01)
(Continued)

(52) U.S. Cl.
CPC ........... *H01M 4/366* (2013.01); *C01B 32/156* (2017.08); *H01M 4/0404* (2013.01);
(Continued)

(58) Field of Classification Search
None
See application file for complete search history.

(56) References Cited

U.S. PATENT DOCUMENTS

2013/0224594 A1* 8/2013 Yushin ..................... H01M 4/38
252/182.1
2013/0330619 A1* 12/2013 Archer ................ H01M 4/1399
264/129

(Continued)

FOREIGN PATENT DOCUMENTS

CN        109346689 A  *  2/2019  ............ H01M 4/364

OTHER PUBLICATIONS

CN109346689A translated (Year: 2019).*

*Primary Examiner* — Haroon S. Sheikh
(74) *Attorney, Agent, or Firm* — PATTAO LLC; Junjie Feng

(57) ABSTRACT

An electrode material, its manufacturing method, and its use as a cathode material in batteries are provided. The electrode material comprises a plurality of nanoparticles, each having a diameter of approximately 100-400 nm and comprising a core and a shell encapsulating the core. The shell comprises carbon and nitrogen, respectively having a mass fraction of approximately 70-90% and approximately 5-20% relative to a total mass of the shell. The core comprises sulfur, having a mass fraction of approximately 40-97% relative to a total mass of the core. The core has a mass fraction of approximately 50-90% relative to a total mass of each nanoparticle. The electrode material can be used in a cathode of a Li—S battery, which has a good energy storage capacity, a high electrochemical stability, and a low capacity decay.

13 Claims, 14 Drawing Sheets

(51) Int. Cl.
*H01M 4/02* (2006.01)
*H01M 4/04* (2006.01)
*H01M 4/58* (2010.01)
*H01M 4/587* (2010.01)
*H01M 4/62* (2006.01)
*H01M 10/052* (2010.01)

(52) U.S. Cl.
CPC ........... *H01M 4/581* (2013.01); *H01M 4/587* (2013.01); *H01M 4/623* (2013.01); *H01M 10/052* (2013.01); *C01P 2002/54* (2013.01); *C01P 2002/88* (2013.01); *C01P 2004/03* (2013.01); *C01P 2004/04* (2013.01); *C01P 2004/34* (2013.01); *C01P 2004/62* (2013.01); *C01P 2006/14* (2013.01); *C01P 2006/40* (2013.01); *H01M 2004/021* (2013.01); *H01M 2004/028* (2013.01)

(56) References Cited

U.S. PATENT DOCUMENTS

| 2015/0221935 A1* | 8/2015 | Zhou | H01M 4/366 |
| | | | 427/221 |
| 2019/0322538 A1* | 10/2019 | Liu | C01B 39/38 |
| 2020/0118770 A1* | 4/2020 | Liu | H01G 11/86 |

\* cited by examiner

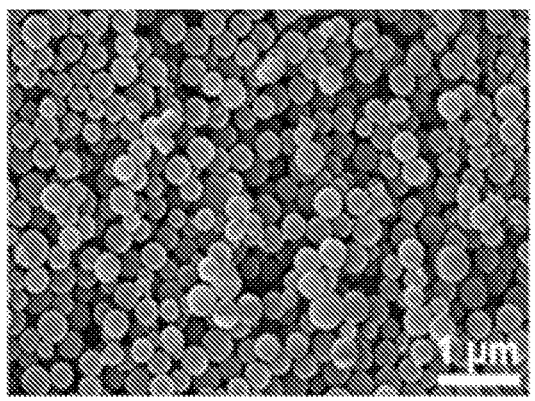 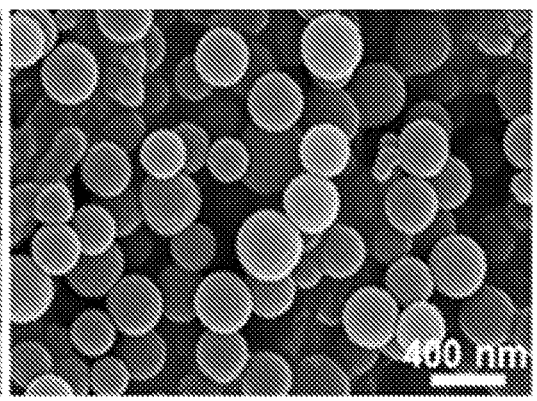
FIG. 1A  FIG. 1B
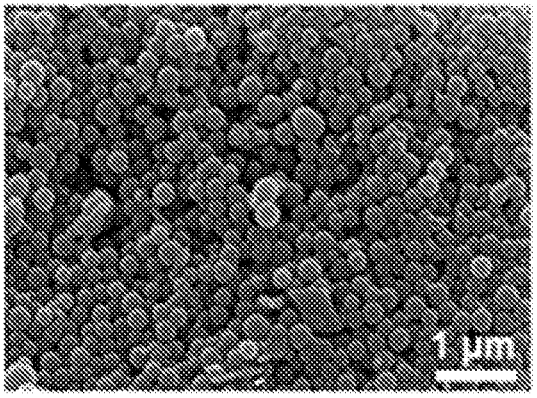 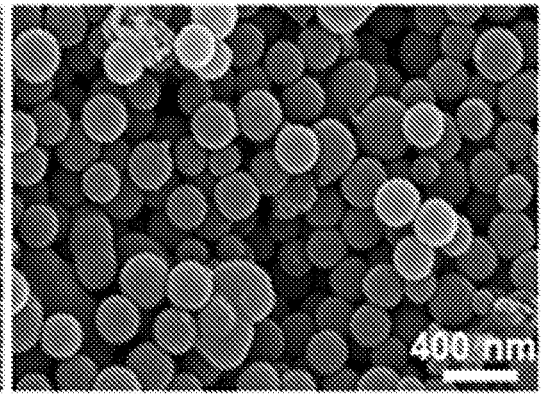
FIG. 2A  FIG. 2B
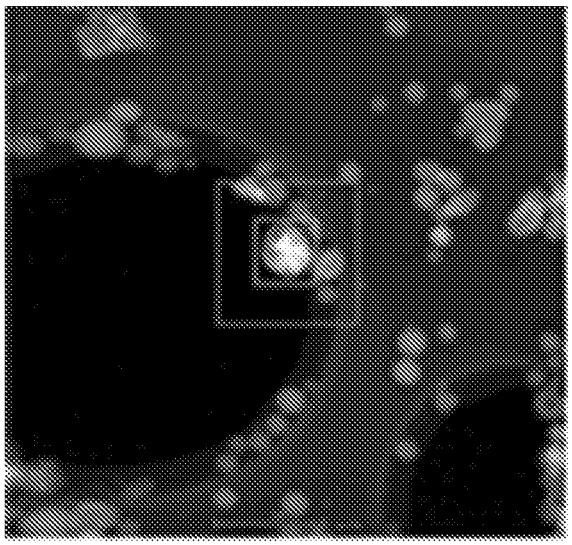 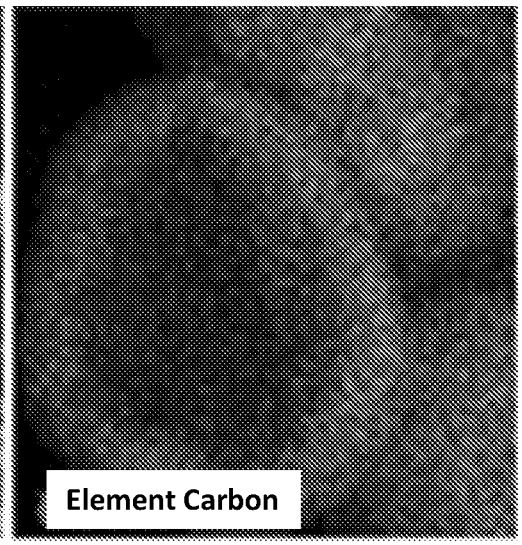
FIG. 3A  FIG. 3B

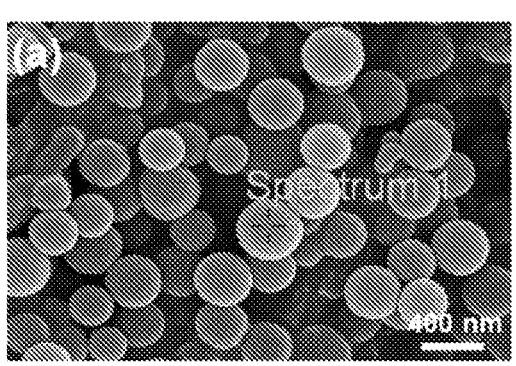
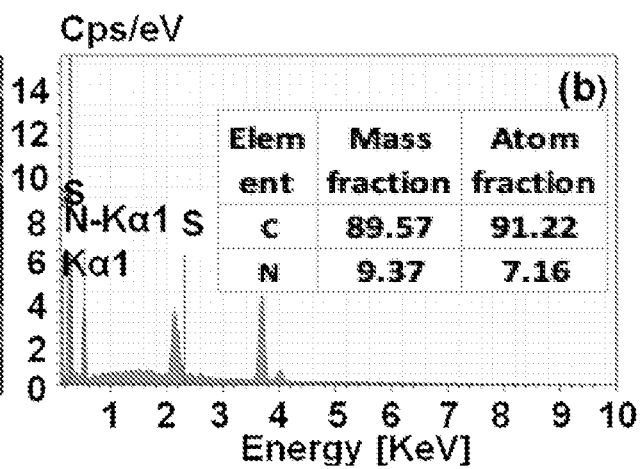
FIG. 9A  FIG. 9B
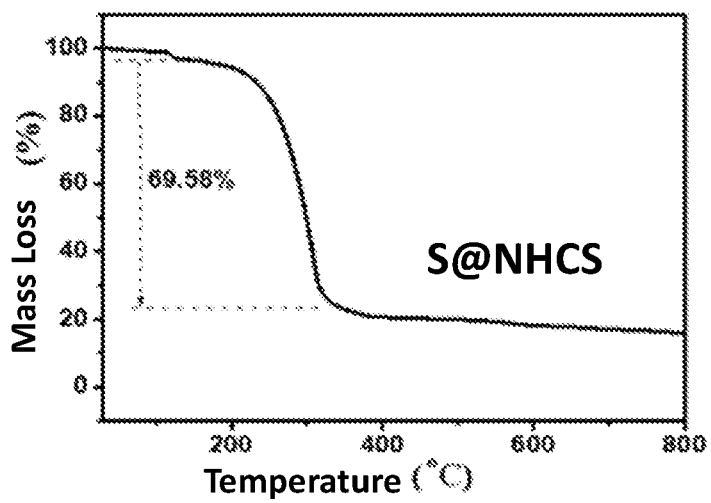
FIG. 10
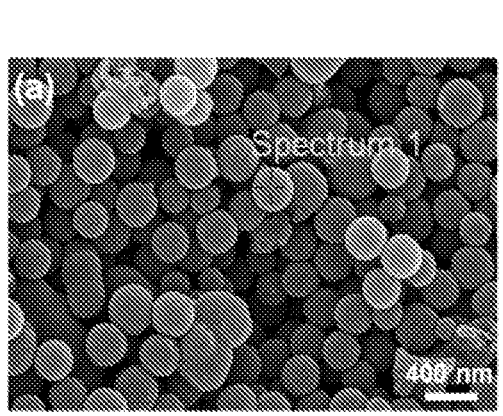
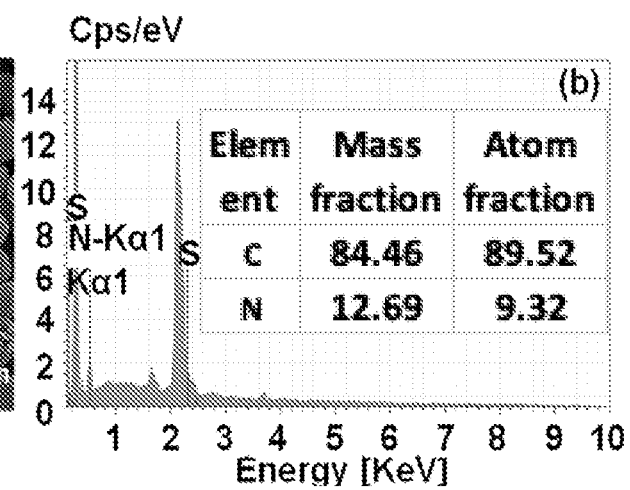
FIG. 11A  FIG. 11B

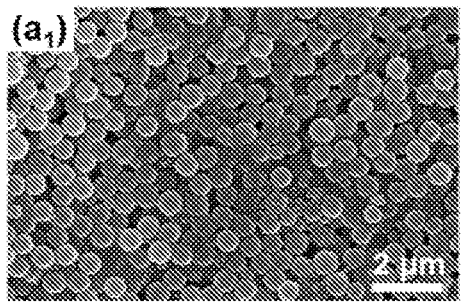
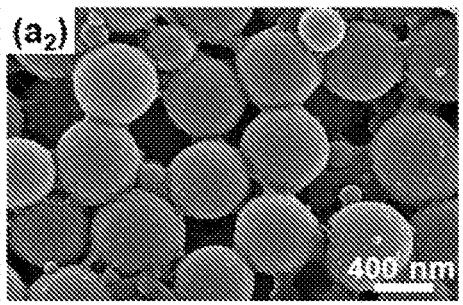
FIG. 14A　　　　　　FIG. 14B
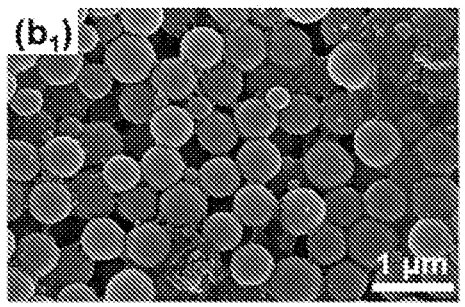
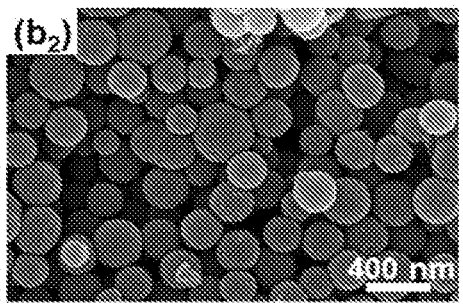
FIG. 14C　　　　　　FIG. 14D
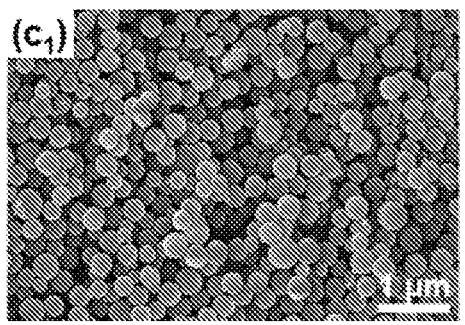
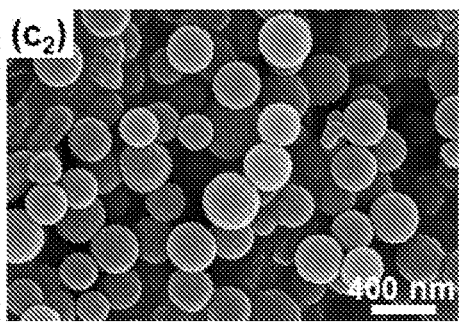
FIG. 14E　　　　　　FIG. 14F
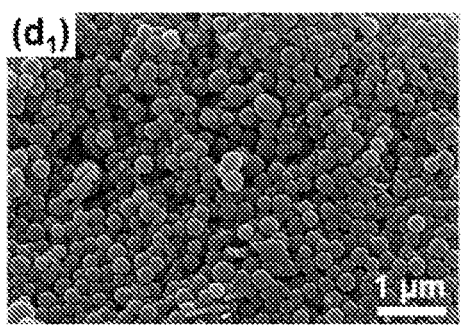
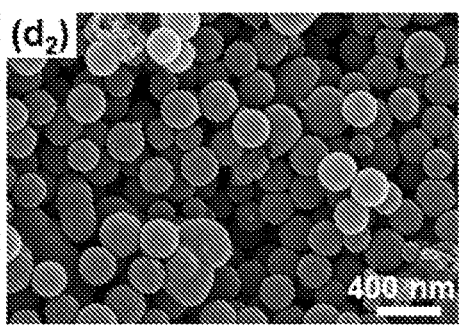
FIG. 14G　　　　　　FIG. 14H

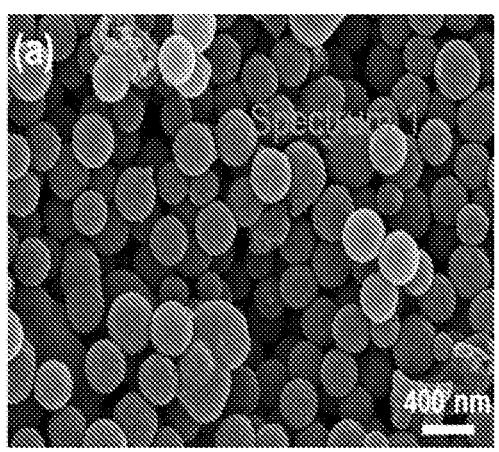
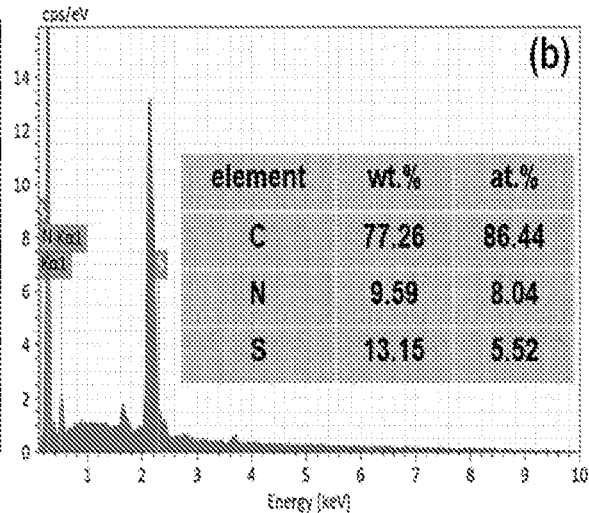
FIG. 15A  FIG. 15B
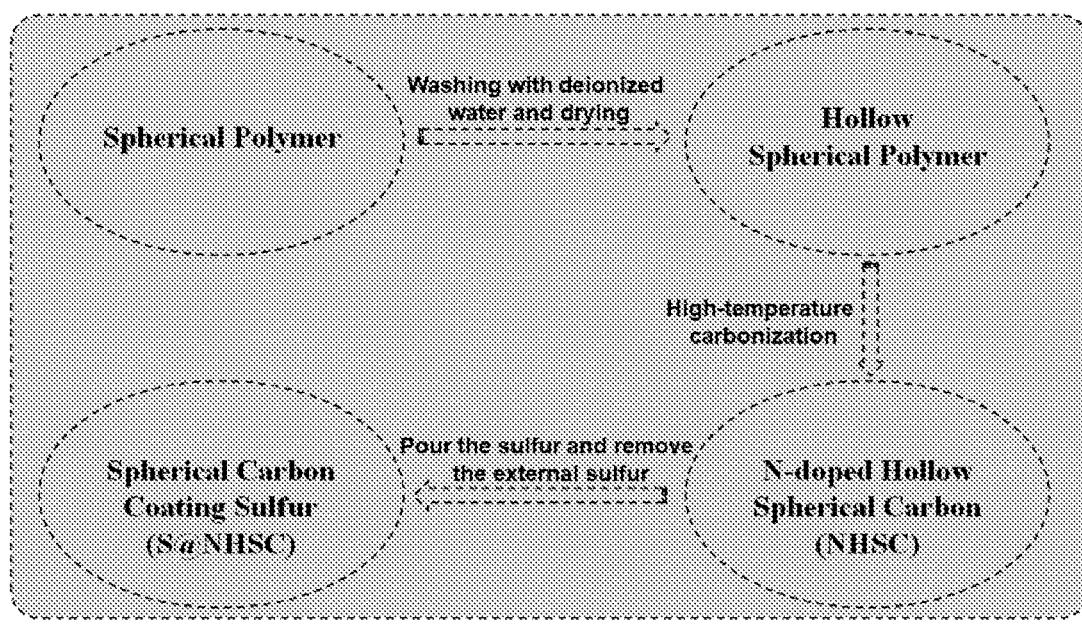
FIG. 16

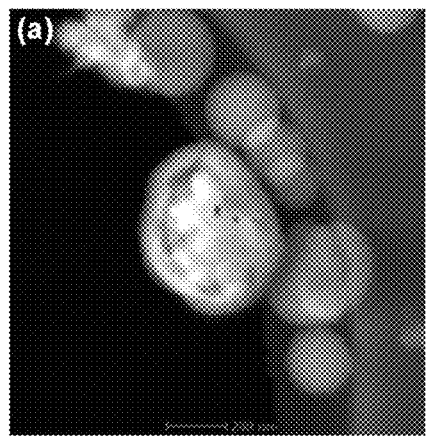
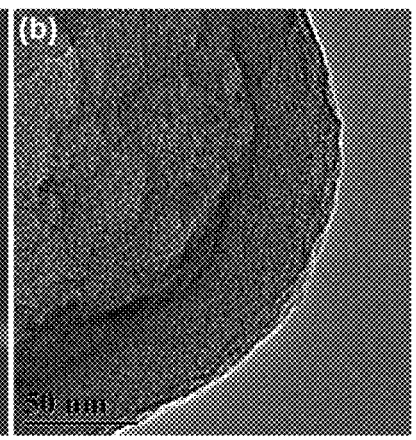
FIG. 19A　　　　　　　FIG. 19B
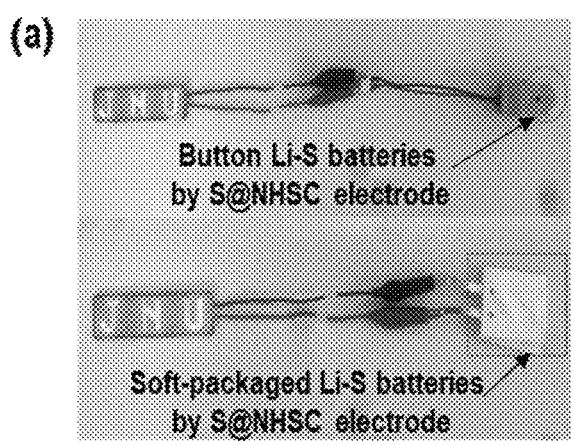
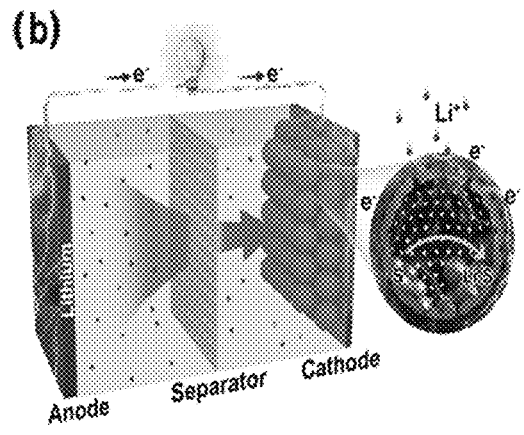
FIG. 20A　　　　　　　FIG. 20B
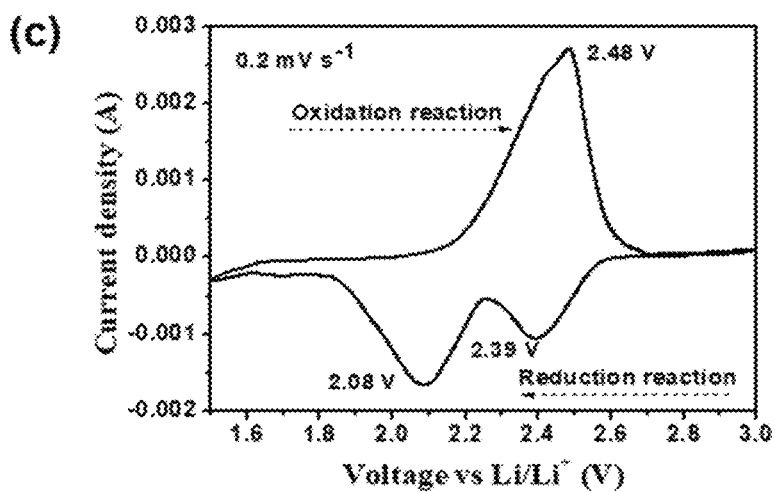
FIG. 20C

ELECTRODE MATERIALS, AND METHODS OF MANUFACTURING AND USE THEREOF

CROSS-REFERENCE TO RELATED APPLICATION

The present application claims priority to Chinese Patent Application No. 201911148246.2 filed on Nov. 21, 2019, whose disclosure is hereby incorporated by reference in its entirety.

TECHNOLOGY FIELD

This present disclosure relates generally to the technical field of energy storage, specifically to electrode materials, and more specifically to sulfur electrode materials that can be employed in cathodes of lithium- or sodium-sulfur batteries. In more particular, the present disclosure relates to cathode materials comprising nitrogen-doped carbon cages encapsulating elemental sulfur, and to methods of manufacturing and use thereof.

BACKGROUND

With the burgeoning of portable electronic products and the implementation of national new energy strategy, development of lithium-ion batteries with relatively higher specific energy density has become an urgent need in the market.

A lithium sulfur (Li—S) battery has a theoretical specific energy capacity (i.e. energy per unit mass) of 1672 mAh/g and a theoretical specific energy density (i.e. energy density per unit mass) of 2600 Wh/kg, which is far higher than the ternary lithium battery with other cathode materials that are commercially widely applied right now, and thus represents a promising lithium battery. More importantly, the closed lithium-sulfur battery system is similar to the lithium-ion battery, and thus with regard to battery manufacturing, the conversion from lithium-ion batteries to lithium-sulfur batteries is simpler and more effective, thereby making it commercially more feasible than the open lithium-air system. In addition, from the economic point of view, elemental sulfur not only has little impact on the environment and human beings, but it is also one of the most abundant elements on the earth. At present, its average price is only $0.25/kg, which is less than 1% of the price of $LiCoO_2$ (with an average price of $40/kg). In additional, because sulfur is easy to sublimate and the reaction products are easy to dissolve, the recovery of sulfur from traditional cathode materials is more cost-effective than the recovery of metal materials.

These advantages allow the lithium-sulfur batteries to have a great cost advantage over lithium-ion batteries. From the perspective of large-scale manufacturing of energy storage devices, the cost control is a particularly important issue. The accumulation of cost savings for each battery cell can bring huge economic benefits to the establishment and promotion of fixed energy storage batteries. At present, the latest research on lithium-sulfur batteries shows that the raw material cost of the lithium-sulfur batteries is only half of the lithium-ion batteries having a same capacity in the market, thereby providing a good foundation for marketing of the products.

However, there are still some key issues to be solved before the commercial application of lithium-sulfur batteries. Regarding the sulfur cathode, the following issues lead to poor electrochemical performance: 1) The low conductivity of elemental sulfur and polysulfide compounds (conductivity is $5 \times 10^{-30}$ Siemens/cm) causes the sulfur carried on part of the electrodes unable to react in according to $S+2Li^{+}+2e^{-} \rightarrow Li_2S$, which in turn results in a low utilization rate of the active sulfur; 2) The polysulfide compounds (i.e. $Li_2S_8$, $Li_2S_6$, $Li_2S_4$) generated in the reaction are easily dissolved in common ether electrolytes, and thus can shuttle back and forth between the positive and negative electrodes during the processes of charge and discharge, resulting in a "shuttle effect" to thereby have a poor cycle stability of the batteries; 3) The different densities between the charge products and the discharge products at the positive electrode of the battery cause the volume of the positive electrode to expand (up to 80%) after discharge. During the charge-discharge cycle, the volume of the electrode changes repeatedly, causing the active substance to easily separate from the current collector, which in turn leads to reduced cycle performance of the batteries.

SUMMARY OF THE INVENTION

In light of the above issues associated with existing sulfur cathodes of the lithium-sulfur batteries, the present disclosure provides an electrode material that can be employed in the cathode of a lithium-sulfur battery, its manufacturing method, and its use in batteries.

In a first aspect, the present disclosure provides an electrode material, comprising a plurality of nanoparticles, each having a diameter of approximately 100-400 nm and comprising a core and a shell encapsulating the core. The shell comprises carbon and nitrogen, respectively having a mass fraction of approximately 70-90% and approximately 5-20% relative to a total mass of the shell. The core comprises sulfur, having a mass fraction of approximately 40-97%, and preferably of approximately 80-95%, relative to a total mass of the core. The core has a mass fraction of approximately 50-90%, and preferably of approximately 65-72%, relative to a total mass of each nanoparticle.

In certain embodiments of the electrode material, the electrode material has an electrical conductivity of approximately 0.90-2.50 S·cm$^{-1}$, and preferably 1.00-1.40 S·cm$^{-1}$.

In certain embodiments of the electrode material, each nanoparticle has a mesoporous structure, having a total pore volume of approximately 0.10-1.20 cm$^3$·g$^{-1}$, and preferably 0.15-0.20 cm$^3$·g$^{-1}$.

In certain embodiments of the electrode material, the shell of each nanoparticle has a thickness of approximately 10-100 nm, and preferably of approximately 20-40 nm.

In certain embodiments of the electrode material, each nanoparticle substantially has a shape of a sphere.

In certain embodiments of the electrode material, the plurality of nanoparticles have substantially uniform sizes.

In a second aspect, the present disclosure further provides a method for manufacturing the electrode material as described in the first aspect. The manufacturing method comprises the following steps:

(1) fabricating the shell of each nanoparticle, such that the shell comprises carbon and nitrogen, respectively having a mass fraction of approximately 70-90% and approximately 5-20% relative to a total mass of the shell; and (2) encapsulating a core material into the core of each nanoparticle, such that the core material comprises sulfur having a mass fraction of approximately 40-97%, and preferably of approximately 80-95%, relative to a total mass of the core material, and the core material has a mass fraction of approximately 50-90%, and preferably of approximately 65-72%, relative to a total mass of each nanoparticle.

In the method, the step (1) of fabricating the shell of each nanoparticle can comprise the following sub-steps (a)-(d):

(a) mixing at least one hydrophilic substance, at least one hydrophobic substance, at least one surfactant, at least one amphiphilic substance to thereby obtain a mixture, such that the at least one hydrophobic substance forms a plurality of vesicles in a medium of the at least one hydrophilic substance in presence of the at least one surfactant, and molecules of the at least one amphiphilic substance self-assemble at a hydrophilic-hydrophobic interface of each vesicle;

(b) allowing the molecules of the at least one amphiphilic substance self-assembled at the hydrophilic-hydrophobic interface of each vesicle to polymerize, thereby obtaining a plurality of polymerized particles;

(c) collecting the plurality of polymerized particles, and introducing porosity thereinto;

(d) performing a carbonization treatment to the plurality of polymerized particles, thereby obtaining the shell for each of the plurality of nanoparticles;

Herein, one or more of the at least one amphiphilic substance can be a nitrogen-containing amphiphilic substance, and the at least one hydrophilic substance, the at least one hydrophobic substance, the at least one surfactant, and the at least one amphiphilic substance do not cross-react with one another.

In certain embodiments of the method, the nitrogen-containing amphiphilic substance can comprise at least one of a dopamine, methacrylate-2-(N,N-dimethylamine) ethyl ester, N-isopropylacrylamide, or 2-(dimethylamino) ethyl ester. Herein, the dopamine can comprises at least one of dopamine hydrochloride, dopamine hydroxylase, dopamine sulfate, dopamine nitrate, or dopamine phosphate.

In certain embodiments of the method, each of the at least one hydrophilic substance is a polar solvent, which can comprise at least one of water, an alcohol, an aldehyde and a carboxylic acid. Herein, the alcohol can be any alcohol that is polar, such as ethanol, menthol, propanol, etc., the aldehyde can be any aldehyde that is polar, such as formaldehyde, acetaldehyde, propionaldehyde, etc., and the carboxylic acid can be any carboxylate that is polar, such as formic acid, acetic acid, etc.

In certain preferred embodiments of the method, the at least one hydrophilic substance comprises water and an alcohol, which have a volume ratio of approximately 1:1 (v/v). The alcohol can be more preferably ethanol.

In certain embodiments of the method, each of the at least one hydrophobic substance is a nonpolar organic solvent, selected from a group consisting of 1,3,5-trimethylbenzene, benzene, gasoline, chloroform, and ethyl acetate. Preferably, the at least one hydrophobic substance comprises 1,3,5-trimethylbenzene.

In certain embodiments of the method, each of the at least one surfactant is selected from a group consisting of polyethylene-polypropylene glycol, ammonium sodium dodecyl sulfate, and dodecyl polyoxyethylene ether sulfate. Preferably, the at least one surfactant comprises polyethylene-polypropylene glycol.

In certain embodiments of the method, the sub-step (a) is carried by at least one of sonication or stirring.

In certain embodiments of the method, the sub-step (b) comprises a sub-step of mixing an initiator into the mixture, thereby allowing the molecules of the at least one amphiphilic substance self-assembled at the hydrophilic-hydrophobic interface of each vesicle to polymerize to thereby obtain a plurality of polymerized particles.

Herein the initiator can comprise at least one of ammonium hydroxide, potassium persulfate, sodium persulfate, or oxidant-ammonium peroxydisulfate. Preferably, the initiator comprises ammonium hydroxide. More preferably, the initiator comprises a saturated ammonium hydroxide solution.

In certain embodiments of the method, the sub-step (c) comprises the following sub-steps:

collecting the plurality of polymerized particles;

washing the plurality of polymerized particles with at least one evaporable substance such that the at least one evaporable substance infiltrates within each of the plurality of polymerized particles; and performing a thermal reaction to the washed plurality of polymerized particles, such that evaporation of the at least one evaporable substance within each of the plurality of polymerized particles introduces porosity thereinto.

Herein, each of the at least one evaporable substance can be water, an alcohol (e.g. ethanol), or a combination thereof, the thermal reaction can be a hydrothermal reaction performed under a temperature of 90-120° C. and lasting for 20-25 hours.

In certain embodiments of the method, the carbonization treatment in the sub-step (d) is performed under a temperature of 700-880° C. and lasting for 100-150 min.

In certain embodiments of the method, the step (2) is realized through a chemical reaction producing elemental sulfur, comprising: mixing the plurality of polymerized particles with substrates of the chemical reaction, such that a solid form of elemental sulfur is formed within the shell of each of the plurality of polymerized particles. Herein optionally, the substrates comprise a thiosulfate and an acid. Further optionally, the thiosulfate comprises at least one of sodium thiosulfate, potassium thiosulfate, lithium thiosulfate, or ammonium thiosulfate; and the acid comprises at least one of hydrochloric acid or sulphuric acid.

In certain embodiments of the method, the step (2) is realized through a physical reaction, which can be realized through the following two options.

In a first option, the physical reaction in step (2) comprises the following sub-steps:

preparing a mixture of the plurality of polymerized particles and a solid form of sulfur;

heating the mixture such that the solid form of sulfur melts into a molten form and infiltrates into an inside of the plurality of polymerized particles; and cooling the mixture and collecting sulfur-infiltrated polymerized particles.

Herein, the sub-step of heating the mixture is under a temperature of 130-200° C. and for 10-200 min.

In a second option, the physical reaction in step (2) comprises:

mixing the plurality of polymerized particles with a solution comprising dissolved sulfur, such that the dissolved sulfur flows into an inside of the plurality of polymerized particles; and precipitating a solid sulfur within the inside of the plurality of polymerized particles from the dissolved sulfur.

In any of embodiments of the method described above for encapsulating sulfur into the core of each nanoparticle, the step (2) further comprises: removing sulfur absorbed on an outer surface of each of the plurality of polymerized particles, which can optionally be realized by a heating treatment, such as that performed under a temperature of 150-180° C. in a blow of a gas. Herein, the gas can be $N_2$, $H_2$, $O_2$, an inert gas, or a combination thereof.

In a third aspect, the present disclosure further provides an electrochemical apparatus. The electrochemical apparatus comprises an electrode, which can comprise an electrode material according to any embodiment of the electrode material as described above in the first aspect.

In certain embodiments of the electrochemical apparatus, the electrode further comprises a current collector, and the current collector is coated, and electrically coupled, with the electrode material.

Herein, optionally the current collector is coated with the electrode material by means of an adhesive, and preferably of a conductive adhesive.

Optionally, the adhesive comprises at least one of an organic polysiloxane binder or an organic fluoropolymer binder. Preferably, the organic fluoropolymer binder comprises polyvinylidene fluoride (PVDF).

Further optionally, the current collector comprises at least one of aluminum, copper, gold, silver, or tin.

Herein, the electrochemical apparatus can be a battery, and the electrode can be a cathode of the battery. Preferably, the battery is a Li—S battery, a Na—S battery, a K—S battery, or a Fe—S battery, or an Al—S battery. Further preferably, the battery is a Li—S battery.

In certain embodiments of the electrochemical apparatus, the cathode has a capacity retention rate of at least 20%, preferably at least 40%, more preferably at least 60%, more preferably at least 80% after 500 cycles at a current density of 1 C.

In certain embodiments of the electrochemical apparatus, the cathode has a Li$^+$ diffusion coefficient ($D_{Li}^+$) for oxidation peaks lower than $5 \times 10^{-8}$ cm$^2$ s$^{-2}$, and preferably lower than $1.0 \times 10^{-8}$ cm$^2$ s$^{-2}$.

In certain embodiments of the electrochemical apparatus, the battery has a practical energy higher than 320 Wh kg$^{-1}$, and preferably higher than 350 Wh kg$^{-1}$.

As used herein, the term "nanoparticles" refers to microscopic particles at the nanoscale, which typically have diameters of approximately 1-500 nm.

As used herein, the term "mass fraction" refers to the percentage of the mass of a substance in the total mass of the composition or a specific portion thereof, or of a whole structure or a sub-structure thereof (e.g. shell or core).

As used herein, the term "capacity retention rate" refers to the ratio of the capacity of the next discharge divided by the capacity of the previous discharge.

As used herein, the term "electrical conductivity" refers to a parameter for the ease of charge flow in a substance. The value is equal to the reciprocal of the resistivity. Measurement of the electrical conductivity of powder materials such as the cathode materials comprising nitrogen-doped carbon cages encapsulating elemental sulfur disclosed herein can reference to S Zeng, et al., *ChemSusChem* 2017, 10, 3378-3386. Briefly, powder materials can be compressed at a pressure (e.g. 20-60 MPa) to form circular sheets with the same diameter using a tablet compression machine. The resistance (donated as R) of the circular sheet can be measured on a KEITHLEY 2636B source-meter using a two-probe method. The diameter (donated as L1) and thickness (L2) of the circular sheet are measured by vernier caliper. Electrical conductivities were calculated by the following formula:

$$\sigma = 4 \cdot L2 / 3.14 \cdot R \cdot (L1)^2$$

where σ is the electrical conductivity, L1 is a diameter of the circular sheet, L2 is a thickness of the circular sheet, and R is the resistance of the circular sheet.

As used herein, the term "mesoporous structure" refers to a porous structure with pore diameters typically of approximately 2-50 nm.

As used herein, the term "capacity decay" refers to the ratio of the capacity of the previous discharge minus the capacity of the next discharge divided by the capacity of the previous discharge.

As used herein, the term "diffusion coefficient" refers to the amount of ions passing through a unit area in a unit time.

As used herein, the term "practical energy density" refers to The amount of practical energy stored in a given space or mass.

BRIEF DESCRIPTION OF THE DRAWINGS

FIG. 1A and FIG. 1B show the scanning electron microscopy (SEM) images of the nitrogen-doped carbon cages material prepared in Example 1, each at a different resolution;

FIG. 2A and FIG. 2B show the SEM images of the cathode material comprising nitrogen-doped carbon cages encapsulating sulfur prepared in Example 2, each at a different resolution;

FIGS. 3A-3D show the transmission electron microscopy (TEM) images indicating the elemental mapping of the cathode material comprising nitrogen-doped carbon cages encapsulating sulfur prepared in Example 3, with FIG. 3A showing the TEM image of electrode material, and FIG. 3B, FIG. 3C and FIG. 3C showing the mapping profiles the elements carbon, nitrogen and sulfur, respectively;

FIG. 9A and FIG. 9B respectively show the SEM image, and the element content profile and table of the nitrogen-doped carbon cages materials prepared in Example 1;

FIG. 10 shows the thermogravimetric (TG) profile of the materials contained in the electrode material comprising nitrogen-doped carbon cages encapsulating sulfur prepared in Example 1;

FIG. 11A and FIG. 11B respectively show the SEM image, and the element content profile and table of the materials contained in the electrode material comprising nitrogen-doped carbon cages encapsulating sulfur prepared in Example 2;

FIGS. 14A-14I1 show SEM images of certain intermediate or end products, with FIGS. 14A-14B and FIG. 14C-14D respectively showing polydopamine spheres before and after washing, and with FIGS. 14E-14F and FIG. 14G-14H respectively showing SEM images of NHSC and S@NHSC;

FIGS. 15A and 15B respectively show the SEM image of S@NHSC sample, and the corresponding EDS spectrum for the selected dot (inset depicts the elemental compositions);

FIG. 16 shows a diagram of the synthesis route map of S@NHSC;

FIGS. 19A and 19B respectively show the high magnification STEM image of S@NHSC, and the high magnification TEM image of the S@NHSC;

FIGS. 20A-20H respectively show: a "JNU" shaped array of LEDs lit by button Li—S cells and soft-packaged cells with S@NHSC as the cathode (FIG. 20A); schematic diagram of the configuration of a Li—S cell with a S@NHSC cathode (FIG. 20B); cyclic voltammetry curves of the S@NHSC electrode at a scan rate of 0.2 mV $s^{-1}$ (FIG. 20C); Nyquist curves of the S@NHSC electrode within the frequency range of $10^{-2}$ to $10^5$ Hz (FIG. 20D); cycling performances and Coulombic efficiency of the S@NHSC electrode and S/C electrode at 0.2 C for 100 cycles (FIG. 20E); galvanostatic charge-discharge profiles of the S@NHSC electrode in different cycles (FIG. 20F); rate performances and Coulombic efficiency of the S@NHSC electrode and S/C electrode (FIG. 20G); and galvanostatic charge-discharge profiles of the S@NHSC electrode at various current densities from 0.1 C to 2 C in the voltage range of 1.5 V to 3.0 V (FIG. 20H);

DETAILED DESCRIPTION

Figures 3C, 3D:
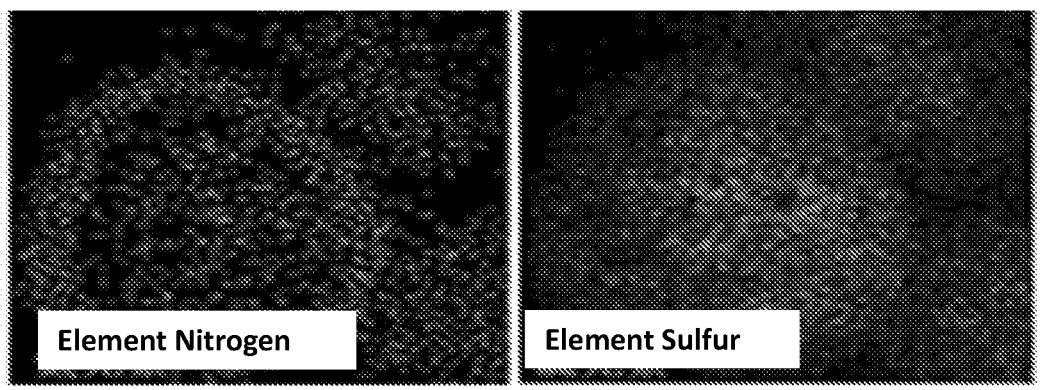

In the following, a detailed description of the inventions provided in the present disclosure is provided, with reference to some specific embodiments and drawings that accompany.

In a first aspect, an electrode material is provided, which comprises nitrogen-doped carbon cages encapsulating sulfur. More specifically, the electrode material comprises a plurality of nanoparticles, each having a diameter of approximately 100-400 nm and comprising a core and a shell encapsulating the core. The shell comprises carbon and nitrogen, respectively having a mass fraction of approximately 70-90% and approximately 5-20% relative to a total mass of the shell. The core comprises sulfur, having a mass fraction of approximately 40-97%, and preferably of approximately 80-95%, relative to a total mass of the core. The core has a mass fraction of approximately 50-90%, and preferably of approximately 65-72%, relative to a total mass of each nanoparticle.

Herein, the electrode material can have an electrical conductivity of approximately 0.90-2.50 S·$cm^{-1}$, and preferably 1.00-1.40 S·$cm^{-1}$. Each nanoparticle can have a mesoporous structure, having a total pore volume of approximately 0.10-1.20 $cm^3·g^{-1}$, and preferably 0.15-0.20 $cm^3·g^{-1}$. The shell of each nanoparticle can have a thickness of approximately 10-100 nm, and preferably of approximately 20-40 nm. Each nanoparticle can take a shape of a sphere, and preferably, can have a substantially uniform diameter.

In some preferred embodiments, the electrode material described above can be used as a cathode material in a battery, such as a Li—S battery. Yet it is of note that the electrode material may also be employed for other purposes, e.g., for use in a non-battery electrochemical apparatus.

In a second aspect, the present disclosure further provides an electrochemical apparatus comprising an electrode, wherein the electrode comprises an electrode material according to any embodiment of the electrode material as described above in the first aspect.

Herein, the electrochemical apparatus can be a battery. Preferably, the battery is a Li—S battery, a Na—S battery, a K—S battery, a Fe—S battery, or an Al—S battery. Further preferably, the battery is a Li—S battery. Accordingly, the electrode comprising the electrode material based on the first aspect is a cathode, or a positive electrode, of the battery.

Optionally in the electrochemical apparatus, the electrode comprises a current collector, which is coated with the electrode material and is further configured to be electrically coupled to the electrode material. Herein, the current collector can have a composition of aluminum, copper, gold, silver, tin, or an alloy comprising any combination of these metals. The current collector can be coated with the electrode material by means of an adhesive, and preferably of a conductive adhesive. Optionally, the adhesive comprises at least one of an organic polysiloxane binder or an organic fluoropolymer binder. Preferably, the organic fluoropolymer binder comprises polyvinylidene fluoride (PVDF).

In the electrochemical apparatus, the cathode may be configured to have a capacity retention rate of at least 20%, preferably at least 40%, more preferably at least 60%, more preferably at least 80% after 500 cycles at a current density of 1 C.

In a third aspect, the present disclosure further provides a method for manufacturing the electrode material as described in the first aspect. The manufacturing method comprises:

S100: fabricating the shell of each nanoparticle, such that the shell comprises carbon and nitrogen, respectively having a mass fraction of approximately 70-90% and approximately 5-20% relative to a total mass of the shell; and S200: encapsulating a core material into the core of each nanoparticle, such that the core material comprises sulfur having a mass fraction of approximately 40-97%, and preferably of approximately 80-95%, relative to a total mass of the core material, and the core material has a mass fraction of approximately 50-90%, and preferably of approximately 65-72%, relative to a total mass of each nanoparticle.

In the method, the step S100 of fabricating the shell of each nanoparticle can comprise the following sub-steps: S110-S140:

S110: mixing at least one hydrophilic substance, at least one hydrophobic substance, at least one surfactant, at least one amphiphilic substance to thereby obtain a mixture, such that the at least one hydrophobic substance forms a plurality of vesicles in a medium of the at least one hydrophilic substance in presence of the at least one surfactant, and molecules of the at least one amphiphilic substance self-assemble at a hydrophilic-hydrophobic interface of each vesicle;

S120: allowing the molecules of the at least one amphiphilic substance self-assembled at the hydrophilic-hydrophobic interface of each vesicle to polymerize, thereby obtaining a plurality of polymerized particles;

S130: collecting the plurality of polymerized particles, and introducing porosity thereinto; and S140: performing a carbonization treatment to the plurality of polymerized particles, thereby obtaining the shell for each of the plurality of nanoparticles;

Herein, one or more of the at least one amphiphilic substance can be a nitrogen-containing amphiphilic substance. It is configured such that the at least one hydrophilic substance, the at least one hydrophobic substance, the at least one surfactant, and the at least one amphiphilic substance do not cross-react with one another.

In certain embodiments of the method, the nitrogen-containing amphiphilic substance can comprise at least one of a dopamine, methacrylate-2-(N,N-dimethylamine) ethyl ester, N-isopropylacrylamide, or 2-(dimethylamino) ethyl ester. Herein, the dopamine can comprises at least one of dopamine hydrochloride, dopamine hydroxylase, dopamine sulfate, dopamine nitrate, or dopamine phosphate. Preferably, the dopamine used herein is dopamine hydrochloride.

In certain embodiments of the method, each of the at least one hydrophilic substance is a polar solvent, which can comprise at least one of water, an alcohol, an aldehyde and a carboxylic acid. Herein, the alcohol can be any alcohol that is polar, such as ethanol, menthol, propanol, etc., the aldehyde can be any aldehyde that is polar, such as formaldehyde, acetaldehyde, propionaldehyde, etc., and the carboxylic acid can be any carboxylate that is polar, such as formic acid, acetic acid, etc. Preferrably, the at least one hydrophilic substance comprises water and an alcohol, having have a volume ratio of approximately 1:1 (v/v). The alcohol is preferably ethanol.

In certain embodiments of the method, each of the at least one hydrophobic substance is a nonpolar organic solvent, selected from a group consisting of 1,3,5-trimethylbenzene, benzene, gasoline, chloroform, and ethyl acetate. Preferably, the at least one hydrophobic substance comprises 1,3,5-trimethylbenzene.

In certain embodiments of the method, each of the at least one surfactant is selected from a group consisting of polyethylene-polypropylene glycol, ammonium sodium dodecyl sulfate, and dodecyl polyoxyethylene ether sulfate. Preferably, the at least one surfactant comprises polyethylene-polypropylene glycol.

In certain embodiments of the method, the sub-step S110 is carried by at least one of sonication or stirring.

In certain embodiments of the method, the sub-step S120 comprises a sub-step of mixing an initiator into the mixture, thereby allowing the molecules of the at least one amphiphilic substance self-assembled at the hydrophilic-hydrophobic interface of each vesicle to polymerize to thereby obtain a plurality of polymerized particles. Herein the initiator can comprise at least one of ammonium hydroxide, potassium persulfate, sodium persulfate, or oxidant-ammonium peroxydisulfate. Preferably, the initiator comprises ammonium hydroxide. More preferably, the initiator comprises a saturated ammonium hydroxide solution.

In certain embodiments of the method, the sub-step S130 comprises the following sub-steps:

collecting the plurality of polymerized particles;

washing the plurality of polymerized particles with at least one evaporable substance such that the at least one evaporable substance infiltrates within each of the plurality of polymerized particles; and performing a thermal reaction to the washed plurality of polymerized particles, such that evaporation of the at least one evaporable substance within each of the plurality of polymerized particles introduces porosity thereinto.

Herein, each of the at least one evaporable substance can be water, an alcohol (e.g. ethanol), or a combination thereof, the thermal reaction can be a hydrothermal reaction performed under a temperature of 90-120° C. and lasting for 20-25 hours.

In certain embodiments of the method, the carbonization treatment in the sub-step S140 is performed under a temperature of 700-880° C. and lasting for 100-150 min.

In certain embodiments of the method, the step S200 is realized through a chemical reaction producing elemental sulfur, comprising:

S210: mixing the plurality of polymerized particles with substrates of the chemical reaction, such that a solid form of elemental sulfur is formed within the shell of each of the plurality of polymerized particles.

Herein optionally, the substrates comprise a thiosulfate and an acid. Further optionally, the thiosulfate comprises at least one of sodium thiosulfate, potassium thiosulfate, lithium thiosulfate, or ammonium thiosulfate; and the acid comprises at least one of hydrochloric acid or sulphuric acid. Preferably, the substrates include sodium thiosulfate and hydrochloric acid.

In certain embodiments of the method, the step S200 is realized through a physical reaction, which can be realized through the following two options.

In the first option, the physical reaction in step S200 comprises the following sub-steps:

S210': preparing a mixture of the plurality of polymerized particles and a solid form of sulfur; and S220': heating the mixture such that the solid form of sulfur melts into a molten form and infiltrates into an inside of the plurality of polymerized particles; and S230': cooling the mixture and collecting sulfur-infiltrated polymerized particles.

Herein, the sub-step S220' of heating the mixture can be performed under a temperature of 130-200° C. and for 10-200 min.

In the second option, the physical reaction in step (2) comprises:

S210": mixing the plurality of polymerized particles with a solution comprising dissolved sulfur, such that the dissolved sulfur flows into an inside of the plurality of polymerized particles; and S220": precipitating a solid sulfur within the inside of the plurality of polymerized particles from the dissolved sulfur.

In any of embodiments of the method described above for encapsulating sulfur into the core of each nanoparticle, the step S200 further comprises a sub-step of:

removing sulfur absorbed on an outer surface of each of the plurality of polymerized particles.

This sub-step can optionally be realized by a heating treatment, such as that performed under a temperature of 150-180° C. in a blow of a gas. Herein, the gas can be $N_2$, $H_2$, $O_2$, an inert gas, or a combination thereof. Preferably the gas is $N_2$.

In order to elaborate the inventions provided above, in the following, with reference to some specific embodiments (i.e. examples) and accompanying drawings, a detailed description of the technical features and effects of the inventions provided herein is further provided. It is of note that these embodiments serve as illustrating examples only, and shall not be interpreted to limited the scope of the present disclosure.

Example 1

In one aspect of the example, a method for manufacturing a material comprising nitrogen-doped carbon cages encapsulating sulfur is provided, which includes the following steps:

Step I: manufacturing the nitrogen-doped carbon cages materials.

(1) mixing dopamine hydrochloride and polyethylene-polypropylene glycol (i.e. F127) (molecular weight: 8000-20000 g/mol) at a mass ratio of 3:5 to thereby obtain a solid mixture A; preparing 1,3,5-trimethylbenzene and a first alcohol-water mixed solution, according to a mass ratio of 1:1.6:10 for the dopamine hydrochloride, the 1,3,5-trimethylbenzene, and the first alcohol-water mixed solution, wherein the first alcohol-water mixed solution is prepared by mixing an alcohol and water at a mass ratio of 1:1; adding, in a sequential manner, the 1,3,5-trimethylbenzene and the first alcohol-water mixed solution to the solid mixture A, and mixing evenly and sufficiently through stirring by means of a magnetic mixer to thereby obtain a mixed solution B.

(2) adding a saturated ammonia solution into the mixed solution B according to a mass ratio of 1:1.5 for the dopamine hydrochloride and the saturated ammonia solution to initiate a polymerization reaction, and allowing the polymerization reaction to occur for 60 mins; collecting suspended particles generated in the mixed solution, and washing the collected particles with an alcohol for 3 times to thereby obtain a solid substance C; adding the solid substance C into a second alcohol-water mixed solution according to the mass ratio of 1:33 for the solid substance C and the second alcohol-water mixed solution to thereby obtain a mixed solution D, wherein the second alcohol-water mixed solution is prepared by mixing an alcohol and water at a mass ratio of 1:1; placing the mixed solution D into a reactor for a hydrothermal reaction at 100° C. for 20 hours; and collecting a solid substance by centrifugation after reaction to thereby obtain a solid mixture E.

(3) placing the solid mixture E in a tubular furnace at 700° C. for 140 minutes to obtain a material comprising nitrogen-doped carbon cages (i.e. nitrogen-doped hollow carbon spheres).

FIG. 1A and FIG. 1B show the scanning electron microscopy (SEM) images of the nitrogen-doped carbon cages material prepared after Step I(3). As shown in the figures, the target material obtained herein contains a plurality of nanoparticles. They have substantially spherical structures, and most are substantially of approximately uniform sizes.

Step II: manufacturing the cathode material comprising nitrogen-doped carbon cages encapsulating sulfur.

(1) adding sodium thiosulfate and the material comprising nitrogen-doped carbon cages into a third alcohol-water mixed solution, according to a mass ratio of 1:12:0.2 for the sodium thiosulfate, the third alcohol-water mixed solution, and the material comprising nitrogen-doped carbon cages, to thereby obtain a solution F, wherein the third alcohol-water mixed solution is prepared by mixing the alcohol and water in a mass ratio of 1:1;

(2) providing 18% of hydrochloric acid, and adding the hydrochloric acid, according to a molar ratio of 1:0.9 for the hydrochloric acid and the sodium thiosulfate, to the solution F for reaction for 4 hours; collecting solid materials after reaction by centrifugation; and heating the solid materials in a tubular furnace, under 150° C. and a nitrogen gas flow at a flow rate of 400 ml/min, for 25 minutes to thereby obtain the cathode material comprising nitrogen-doped carbon cages encapsulating sulfur.

FIG. 9A, and FIG. 9B respectively show the SEM image, and the element content profile and table of the cathode material comprising nitrogen-doped carbon cages encapsulating sulfur obtained in this example. As indicated in the figures, the cathode material comprising nitrogen-doped carbon cages encapsulating sulfur obtained in this example comprises a plurality of nanoparticles having roughly uniform spherical core-shell structures, each having a diameter of 150-300 nm, and the chemical compositions of the shell include carbon (shown as "C" in the embedded element content table) having a mass fraction of approximately 89.57% and nitrogen (shown as "N" in the embedded table) having a mass fraction of approximately 9.37%.

FIG. 10 further shows the thermogravimetric (TG) profile of the cathode material obtained herein. As Further indicated, the chemical compositions of the core include sulfur, which has a mass fraction of approximately 69.58% (shown as the mass loss 69.58% for the cathode material after a sufficient heating treatment, which causes the elemental sulfur to sublime) relative to the total mass of the cathode material comprising nitrogen-doped carbon cages encapsulating sulfur obtained herein. Based on the above measurements, it can be further calculated that the chemical compositions of the core include sulfur having a mass fraction of approximately 93.64% relative to the mass of the core.

In another aspect of the example, a use for the above mentioned cathode material comprising nitrogen-doped carbon cages encapsulating sulfur is further provided, which includes a method of manufacturing or assembling a lithium-sulfur battery comprising the cathode material. The method comprises the following steps:

(1) mixing the cathode material comprising nitrogen-doped carbon cages encapsulating sulfur and polyvinylidene fluoride in a mass ratio of 8:1.45 to thereby obtain an adhesive paste;

(2) coating the adhesive paste onto a conductive aluminum collector with a coating thickness of 300 μm for drying and pressing; and assembling a lithium-sulfur button battery, with lithium metal as an anode, Celgard 2400 as a separator, and LiTFSI dissolved in an electrolyte solvent as an electrolyte, wherein the electrolyte solvent is a mixed solution comprising 1,3-dioxolane and 1,2-dimethoxyethane having a volume ratio of 1:1.

Example 2

In one aspect of the example, a method for manufacturing a material comprising nitrogen-doped carbon cages encapsulating sulfur is provided, which includes the following steps:

Step I: manufacturing the nitrogen-doped carbon cages materials.

(1) mixing dopamine hydrochloride and polyethylene-polypropylene glycol F127 (molecular weight: 10000-20000 g/mol) at a mass ratio of 3:4.5 to thereby obtain a solid mixture A; preparing 1,3,5-trimethylbenzene and a first alcohol-water mixed solution (with a mass ratio of 1:1), according to a mass ratio of 1:1.8:5.5 for the dopamine hydrochloride, the 1,3,5-trimethylbenzene, and the first alcohol-water mixed solution; adding, in a sequential manner, the 1,3,5-trimethylbenzene, and the first alcohol-water mixed solution to the solid mixture A, and mixing evenly and sufficiently through stirring by means of a magnetic mixer to thereby obtain a mixed solution B.

(2) adding a saturated ammonia solution into the mixed solution B according to a mass ratio of 1:1.6 for the dopamine hydrochloride and the saturated ammonia solution to initiate a polymerization reaction, and allowing the polymerization reaction to occur for 50 mins; collecting suspended particles generated in the mixed solution, and washing the collected particles with water for 5 times to thereby obtain a solid substance C; adding the solid substance C into a second alcohol-water mixed solution (with a mass ratio of 1:1) according to the mass ratio of 1:25 for the solid substance C and the second alcohol-water mixed solution to thereby obtain a mixed solution D; placing the mixed solution D into a reactor for a hydrothermal reaction at 90° C. for 25 hours; and collecting a solid substance by centrifugation after reaction to obtain a solid mixture E.

(3) placing the solid mixture E in a tubular furnace at 750° C. for 130 minutes to obtain a material comprising nitrogen-doped carbon cages (i.e. nitrogen-doped hollow carbon spheres).

Step II: manufacturing the cathode material comprising nitrogen-doped carbon cages encapsulating sulfur.

(1) adding sodium thiosulfate and the material comprising nitrogen-doped carbon cages into a third alcohol-water mixed solution (with a mass ratio of 1:1), according to a mass ratio of 1:10:0.3 for the sodium thiosulfate, the third alcohol-water mixed solution, and the material comprising nitrogen-doped carbon cages, to thereby obtain a solution F;

(2) preparing 18% of hydrochloric acid, and adding the hydrochloric acid, according to a molar ratio of 1:0.8 for the hydrochloric acid and the sodium thiosulfate, to the solution F for reaction for 5 hours; collecting solid materials after reaction by centrifugation; and heating the solid materials in a tubular furnace, under 170° C. and a nitrogen gas flow at a flow rate of 500 ml/min, for 20 minutes to thereby obtain the cathode material comprising nitrogen-doped carbon cages encapsulating sulfur.

FIG. 2A and FIG. 2B show the SEM images of the cathode material comprising nitrogen-doped carbon cages encapsulating sulfur after step II(2) provided herein. As shown in the figures, after sulfur is encapsulated into the nitrogen-doped carbon cages, the spherical structures of the material still remain. After blowing by the nitrogen gas flow under a high temperature, the sulfur particles that are not coated/encapsulated/caged are mostly removed.

FIG. 11A and FIG. 11B respectively show the SEM image, and the element content profile and table of the materials contained in the cathode material comprising nitrogen-doped carbon cages encapsulating sulfur prepared by the above manufacturing method. As indicated in the figures, the cathode material obtained in this example comprises a plurality of nanoparticles having substantially uniform spherical core-shell structures, each having a diameter of 150-400 nm. The chemical compositions of the shell include carbon (shown as "C" in the embedded element content table) having a mass fraction of approximately 84.46% and nitrogen (shown as "N" in the embedded element content table) having a mass fraction of approximately 12.69%.

Figure 12:
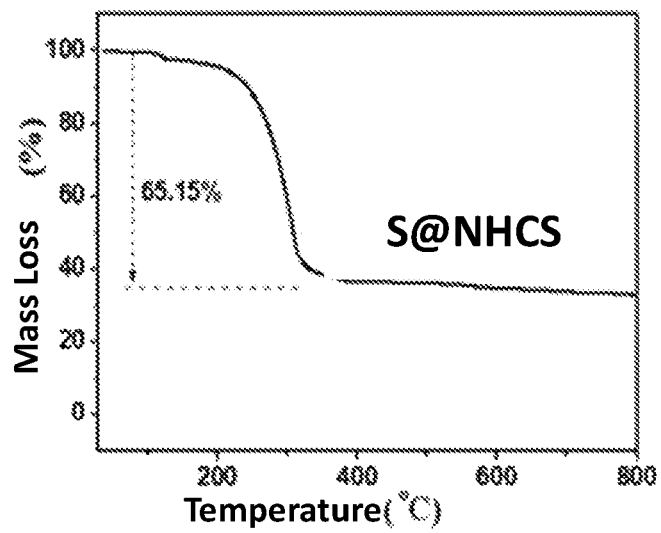
FIG. 12 shows the thermogravimetric (TG) profile of the materials comprising nitrogen-doped carbon cages encapsulating sulfur prepared in Example 2.

FIG. 12 further shows the thermogravimetric (TG) profile of the cathode material comprising nitrogen-doped carbon cages encapsulating sulfur prepared in this example. As indicated in FIG. 12, the chemical compositions of the core include sulfur, which has a mass fraction of approximately 65.15% relative to the total mass of the cathode material obtained herein, based on which it can be calculated that the chemical compositions of the core include sulfur having a mass fraction of approximately 91.24% relative to the mass of the core.

In another aspect of the example, a use for the above mentioned cathode material comprising nitrogen-doped carbon cages encapsulating sulfur is further provided, which includes a method of manufacturing or assembling a lithium-sulfur battery comprising the cathode material. The method comprises the following steps:

(1) mixing the cathode material comprising nitrogen-doped carbon cages encapsulating sulfur and polyvinylidene fluoride in a mass ratio of 8:1.1 to thereby obtain an adhesive paste;

(2) coating the adhesive paste onto a conductive aluminum collector with a coating thickness of 250 μm for drying and pressing; and assembling a lithium-sulfur button battery, with lithium metal as an anode, Celgard 2400 as a separator, and LiTFSI dissolved in an electrolyte solvent as an electrolyte, wherein the electrolyte solvent is a mixed solution comprising 1,3-dioxolane and 1,2-dimethoxyethane having a volume ratio of 1:1.

Figure 4:
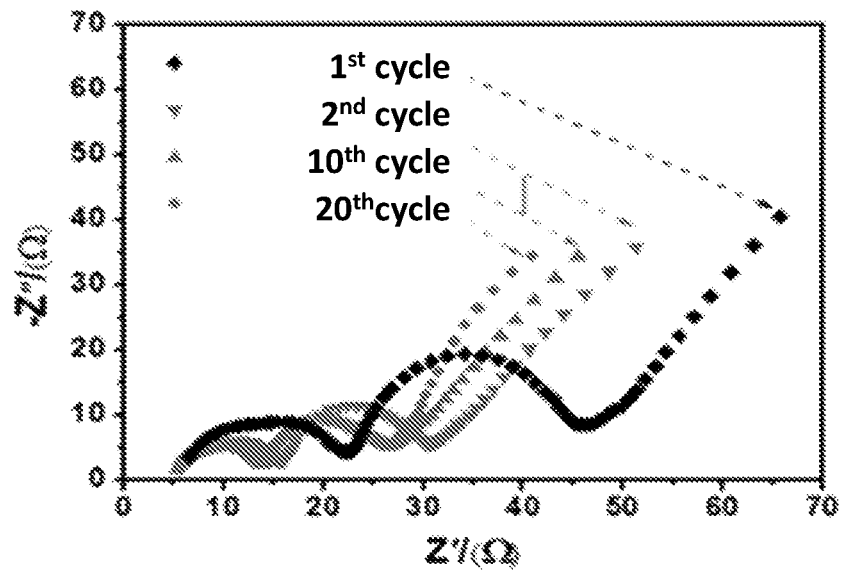
FIG. 4 shows the Nyquist plots of the lithium-sulfur battery assembled in Example 2 after different cycles (i.e. 1$^{st}$, 2$^{nd}$, 10$^{th}$, and 20$^{th}$ cycles)

FIG. 4 shows the Nyquist plots of the lithium-sulfur battery assembled in this example after different cycles (i.e. $1^{st}$, $2^{nd}$, $10^{th}$, and $20^{th}$ cycles). As indicated, the cathode material has a small interface impedance, which is more beneficial to the improvement of the rate performance of the battery.

Figure 7:
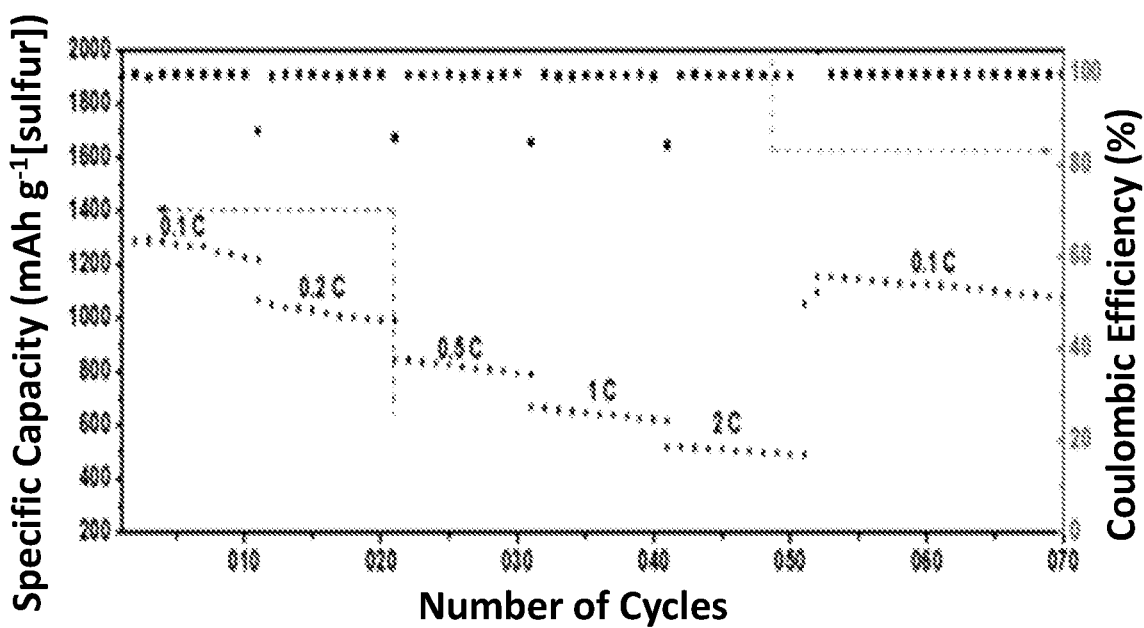
FIG. 7 shows the rate performance profiles of the lithium-sulfur battery assembled in Example 2 at different cycles.
Figure 8:
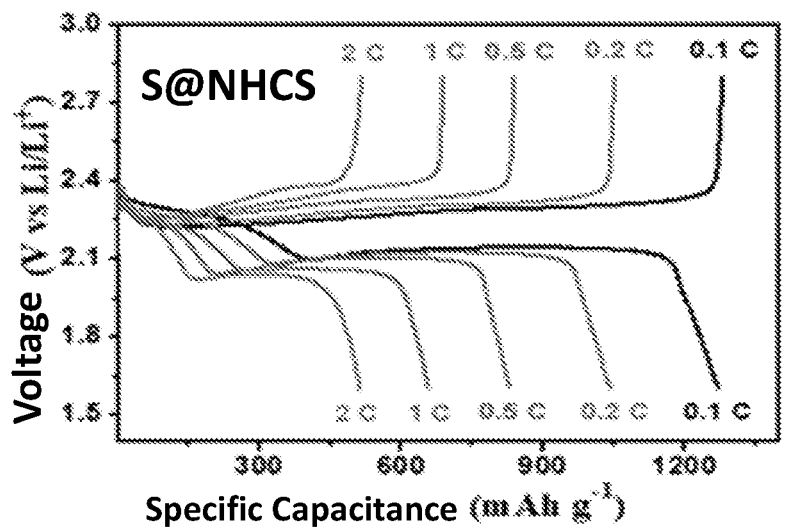
FIG. 8 shows the charge-discharge profiles of the lithium-sulfur battery assembled in Example 2 at various current densities (i.e. 0.1 C, 0.2 C, 0.5 C, 1 C, and 2 C)

FIG. 7 and FIG. 8 respectively show the rate performance profiles and the charge-discharge profiles of the lithium-sulfur battery assembled herein at various current densities. As shown, the battery can charge and discharge at high current densities, indicating that the battery has good rate performance.

Example 3

In one aspect of the example, a method for manufacturing a material comprising nitrogen-doped carbon cages encapsulating sulfur is provided, which includes the following steps:

Step I: manufacturing the nitrogen-doped carbon cages materials.

(1) mixing dopamine hydrochloride and polyethylene-polypropylene glycol F127 (molecular weight: 10000-20000 g/mol) at a mass ratio of 3:3 to thereby obtain a solid mixture A; preparing 1,3,5-trimethylbenzene and a first alcohol-water mixed solution (with a mass ratio of 1:1), according to a mass ratio of 1:1.5:8 for the dopamine hydrochloride, the 1,3,5-trimethylbenzene, and the first alcohol-water mixed solution; adding, in a sequential manner, the 1,3,5-trimethylbenzene, and the first alcohol-water mixed solution to the solid mixture A, and mixing evenly and sufficiently through stirring by means of a magnetic mixer to thereby obtain a mixed solution B.

(2) adding a saturated ammonia solution into the mixed solution B according to a mass ratio of 1:1.3 for the dopamine hydrochloride and the saturated ammonia solution to initiate a polymerization reaction, and allowing the polymerization reaction to occur for 70 mins; collecting suspended particles generated in the mixed solution, and washing the collected particles with water for 2 times and alcohol for 2 time, or with a mixed alcohol water solution (at any ratio) for 3-5 times, to thereby obtain a solid substance C; adding the solid substance C into a second alcohol-water mixed solution (with a mass ratio of 1:1) according to the mass ratio of 1:20 for the solid substance C and the second alcohol-water mixed solution to thereby obtain a mixed solution D; placing the mixed solution D into a reactor for a hydrothermal reaction at 90° C. for 25 hours; and collecting a solid substance by infiltration after reaction to thereby obtain a solid mixture E.

(3) placing the solid mixture E in a tubular furnace at 750° C. for 130 minutes to obtain a material comprising nitrogen-doped carbon cages (i.e. nitrogen-doped hollow carbon spheres).

FIGS. 3A-3D show the transmission electron microscopy (TEM) images for elemental mapping of the cathode material comprising nitrogen-doped carbon cages encapsulating sulfur prepared herein. As indicated in the figures, the compositions in a shell portion comprises elements carbon and nitrogen, whereas the compositions in a core portion comprises element sulfur, thereby indicating that the material prepared herein is of a core-shell structure comprising carbons encapsulating sulfur.

Step II: manufacturing the cathode material comprising nitrogen-doped carbon cages encapsulating sulfur.

(1) adding sodium thiosulfate and the material comprising nitrogen-doped carbon cages into a third alcohol-water mixed solution (with a mass ratio of 1:1), according to a mass ratio of 1:15:0.4 for the sodium thiosulfate, the third alcohol-water mixed solution, and the material comprising nitrogen-doped carbon cages, to thereby obtain a solution F;

(2) preparing 18% of hydrochloric acid, and adding the hydrochloric acid, according to a molar ratio of 1:1 for the hydrochloric acid and the sodium thiosulfate, to the solution F for reaction for 5 hours; collecting solid materials after reaction by centrifugation; and heating the solid materials in a tubular furnace, under 180° C. and a nitrogen gas flow at a flow rate of 600 ml/min, for 15 minutes to thereby obtain the cathode material comprising nitrogen-doped carbon cages encapsulating sulfur.

In another aspect of the example, a use for the above mentioned cathode material comprising nitrogen-doped carbon cages encapsulating sulfur is further provided, including a method of manufacturing or assembling a lithium-sulfur battery comprising the cathode material. The method comprises the following steps:

(1) mixing the cathode material comprising nitrogen-doped carbon cages encapsulating sulfur and polyvinylidene fluoride in a mass ratio of 8:2 to thereby obtain an adhesive paste;

(2) coating the adhesive paste onto a conductive aluminum collector with a coating thickness of 380 μm for drying and pressing; and assembling a lithium-sulfur button battery, with lithium metal as an anode, Celgard 2400 as a separator, and LiTFSI dissolved in an electrolyte solvent as an electrolyte, wherein the electrolyte solvent is a mixed solution comprising 1,3-dioxolane and 1,2-dimethoxyethane having a volume ratio of 1:1.

Figure 5:
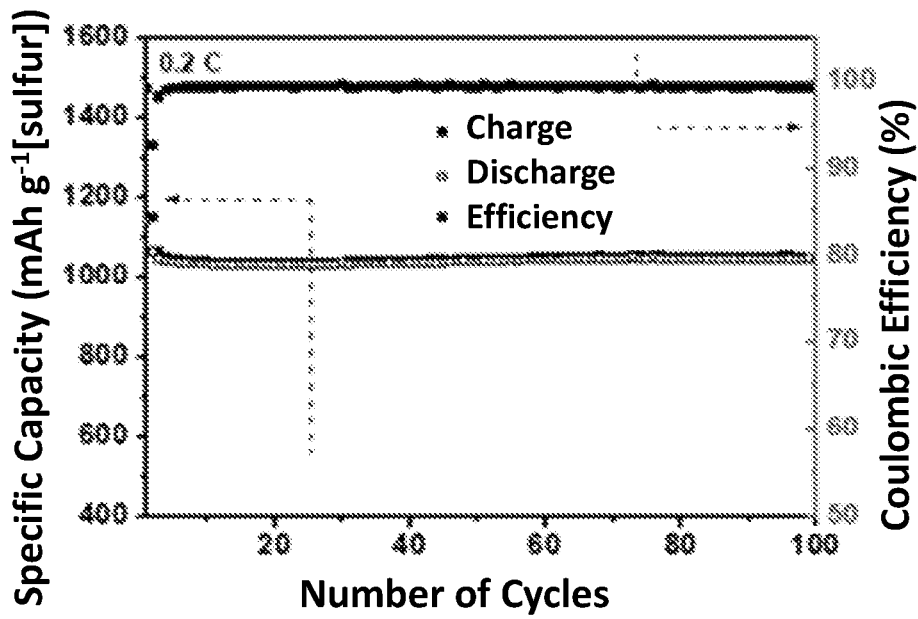
FIG. 5 shows the cycling performance profiles of the lithium-sulfur battery assembled in Example 3.
Figure 6:
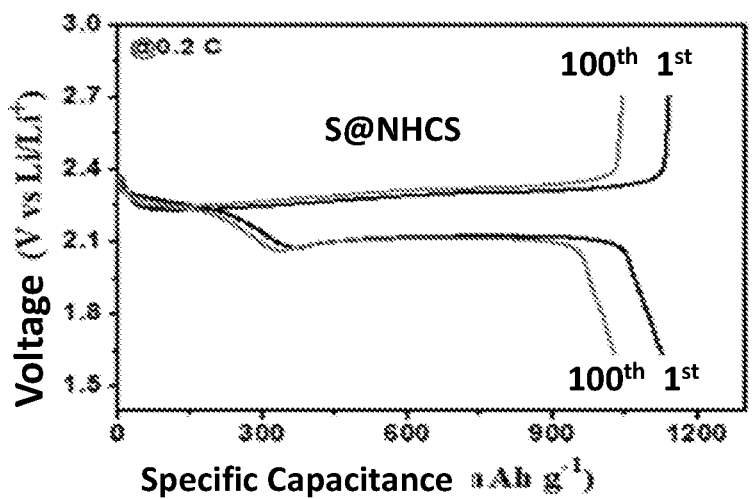
FIG. 6 shows the charge-discharge profiles of the lithium-sulfur battery assembled in Example 3 after different cycles (i.e. 1$^{st}$ and 100$^{th}$ cycles)

FIG. 5 and FIG. 6 respectively show the cycling performance profiles and the charge-discharge profiles in different cycles of the lithium-sulfur battery assembled herein. As shown in the figures, the specific capacity of the battery is 1025 mAh/g after the first charge-discharge cycle, and is 992 mAh/g after 100 cycles, with a decrease of the specific capacity by only 60 mAh/g, thereby indicating a good cycle stability for the material.

Devices used for the above material performance tests in the above examples include the following:

(1) For the morphology tests, a field emission scanning electron microscope and a high resolution transmission electron microscope were used, respectively by means of FEI (scanning electron microscope) and G2 f20fei TECNAI (high resolution transmission electron microscope);

(2) For the sulfur content tests, a Mettler thermogravimetric instrument was used;

(3) For the electrochemical performance tests, a CHI750E electrochemical workstation by Shanghai Chenhua company was used to test Li+/Li as counter and reference electrodes; and (4) For the charge and discharge tests: a Wuhan blue battery test system was used, which has a maximum range of current and voltage of 20 mA and 5 V respectively.

Example 4

This more detailed example similarly took advantage of self-assemblies of dopamine molecules at the water-oil interface to thereby readily prepare the nitrogen-doped carbon cages, i.e. N-doped hollow spherical carbon (NHSC), by controlled pyrolysis of the polymeric ensembles without the use of additional structural templates, which were then used as an efficient sulfur host for sulfur encapsulation, producing the target electrode material comprising the nitrogen-doped carbon cages encapsulating sulfur, i.e. S@NHSC nanocomposites. A high sulfur content was achieved due to the large mesoporous structure inside the carbon spheres, along with good electrical conductivity, thanks to the rampant electron transport pathways of the carbon skeletons. Importantly, the shuttle effect of polysulfides was effectively suppressed as a result of the physical encapsulation of NHSC. In addition, the good catalytic activity of NHSC significantly facilitated the reduction of low-order polysulfides. Benefiting from these unique physical characteristics and novel chemical functionality, the S@NHSC electrode exhibited an exceptional performance as the cathode of Li—S cells.

Figure 13:
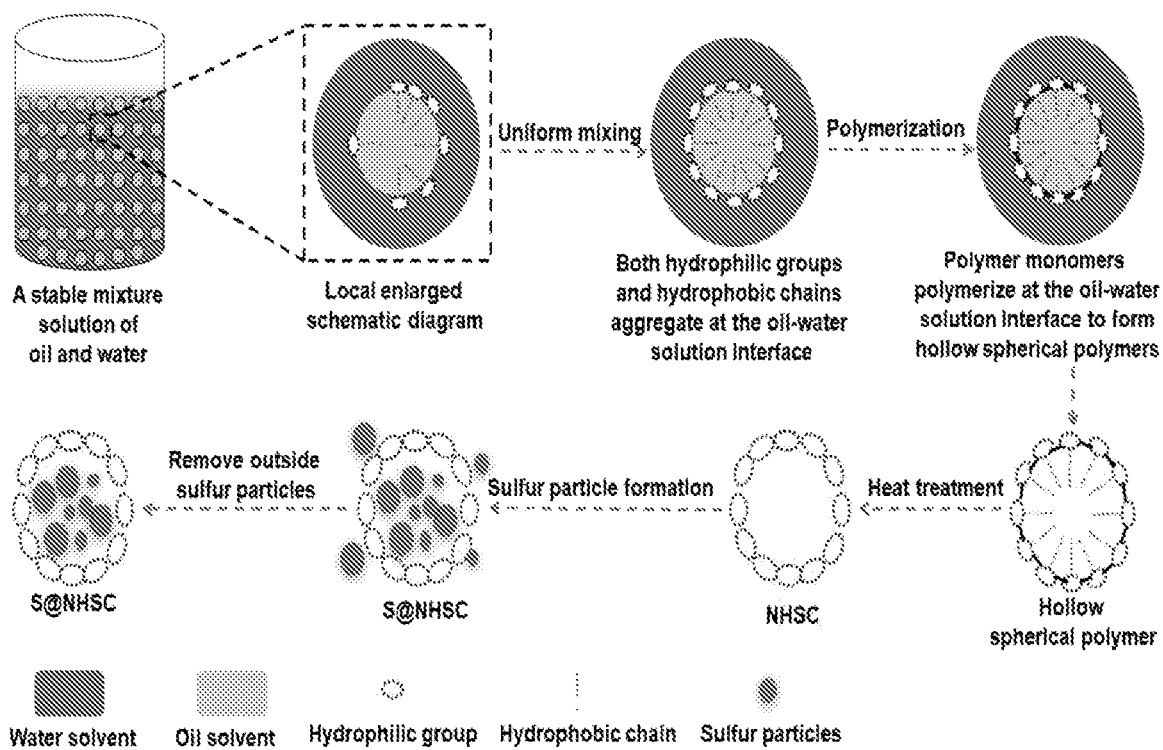
FIG. 13 illustrates a schematic diagram for the formations of NHSC and S@NHSC samples in Example 4.

Briefly, the synthesis of S@NHSC composites is schematically depicted in FIG. 13. Firstly, polydopamine spheres were prepared by the self-assembly of dopamine at the water-oil interface, followed by controlled polymerization. The dopamine molecule consists of the functional groups of catechol and amine. The hydrophilic groups and hydrophobic chains can easily aggregate at the water-oil interface, and interfacial polymerization leads to the in situ formation of polydopamine spheres. Porosity in the polydopamine spheres was induced by washing the polymer droplets with deionized water and evaporation of internal water droplets. In fact, when the polymer spheres were pyrolyzed at 800° C. for 2 h under a nitrogen atmosphere, mesoporous hollow carbon spheres were produced. Sulfur was then produced by the reaction of sodium thiosulfate with hydrochloric acid, and adsorbed inside or on the NHSC, most likely driven by the van der Waals interactions between hydrophobic sulfur and the carbon surface of NHSC. Note that sulfur adsorbed on the outer surface of NHSC was removed by a heating treatment, resulting in the formation of S@NHSC (details in the experimental section).

To investigate the morphology and microstructure of the samples, field-emission scanning electron microscopic images (FESEM) were recorded. From FIGS. 14A and 14B, it can be observed that spherical particles of polydopamine were indeed produced by self-assembly and interfacial polymerization of dopamine molecules, with a diameter in the range of 200-600 nm. The size of the polymer spheres shrank to ca. 400 nm after washing with deionized water and alcohol to remove impurities, where evaporation of the internal water droplets led to the formation of a hollow structure (FIGS. 14C and 14D). After carbonization treatment, carbon spheres (NHSC) were obtained with no appreciable change of the morphologies (FIGS. 14E and 14F). EDS analysis indicates that the NHSC sample consisted of carbon and nitrogen elements, but no sulfur. When a large amount of sulfur was injected into NHSC, massive sulfur nanoparticles were formed onto the carbon sphere surface. Yet, after heating at 150° C. for 10 min in a $N_2$ flow of 200 mL min$^{-1}$, the S particles on NHSC gradually disappeared, because of sulfur sublimation and removal by the rapid nitrogen flow. When the heating time was prolonged to 20 min, it can be observed that the carbon sphere surface became clean, suggesting the encapsulation of sulphur within the NHSC interior (S@NHSC, FIGS. 14G and 14H). Indeed, EDS measurements of S@NHSC clearly showed the presence of elemental sulfur (FIGS. 15A and 15B). The entire synthesis route was included in in FIG. 16, where the compositional evolution was highlighted.

Figures 17A, 17B, 17C:
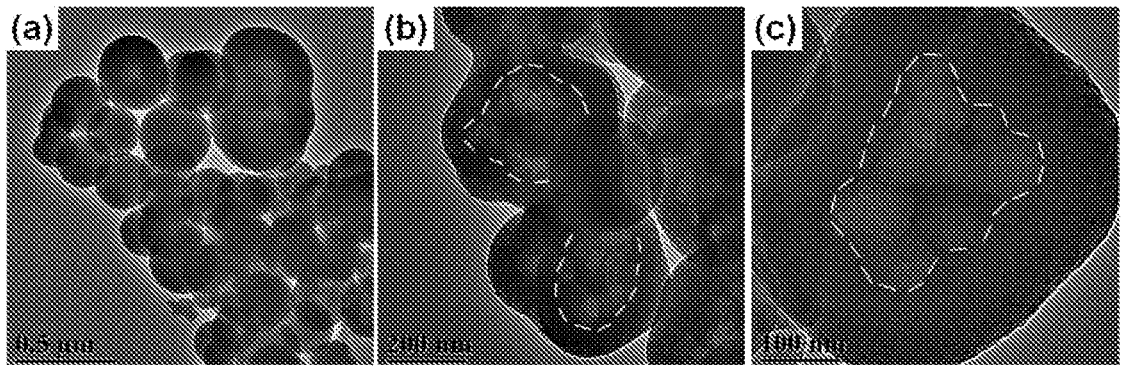
FIGS. 17A-17J show the TEM images of NHSC (FIGS. 17A-17C), S@NHSC (FIGS. 17D-17F), and S@NHSC (FIG. 17G), where corresponding elemental maps of the select region in S@NHSC (FIG. 17G) are shown in C (FIG. 17H), N (FIG. 17I) and S (FIG. 17J)
Figures 17D, 17E, 17F:
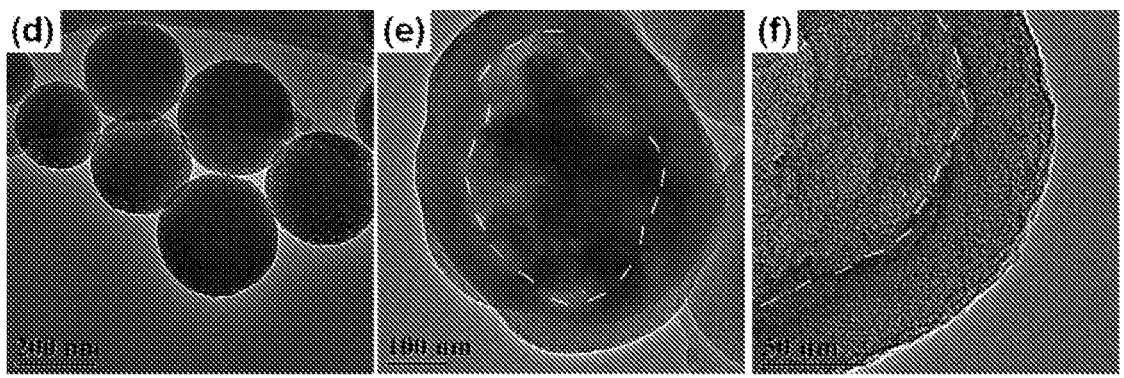
Figures 17G, 17H, 17I, 17J:
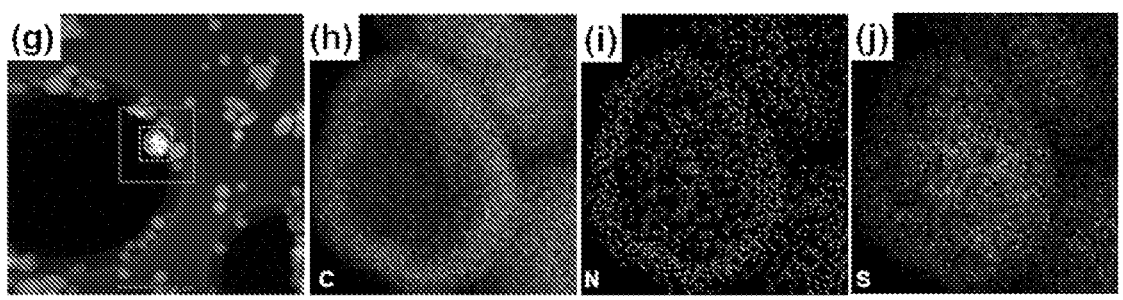

The TEM and elemental mapping measurements analysis were then carried out to further confirm the core-shell structure of the S@NHSC composite. From FIGS. 17A-17C, it can be seen that the sample exhibited a porous hollow spherical structure of ca. 300 nm in diameter and a wall thickness of ca. 30 nm. After sulfur encapsulation, the obtained S@NHSC retained the spherical morphology (FIGS. 17D-17F). High magnification STEM studies clearly show a separate interface layer inside the carbon sphere, which can be ascribed to the coating of the carbon surface by S (FIGS. 19A and 19B). To further reveal the elemental distribution within the hybrid spheres (FIG. 17G), elemental mapping analysis (FIGS. 17H-17J) was carried out, where one can see that the carbon and nitrogen elements were mostly situated in the outer layer of the spheres, whereas the sulfur element was mostly found inside the NHSC sphere. These results confirmed the encapsulation of S within NHSC forming a core-shell structure in S@NHSC.

Figure 18A:
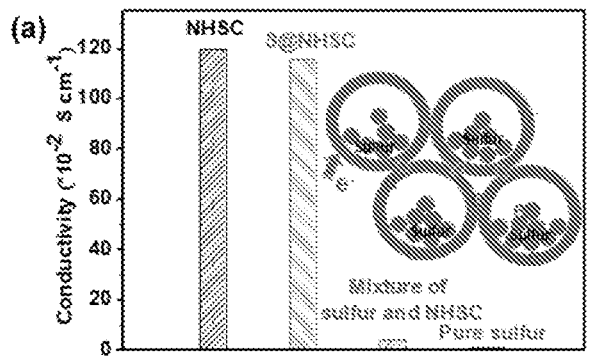
FIGS. 18A-18F respectively show: the electrical conductivity of NHSC, S@NHSC, a mixture of sulfur and NHSC, and pure sulphur alone (FIG. 18A), where inset shows the schematic of electron conduction pathways in S@NHSC; the photographs of electrolytes before and after the addition of various compounds (FIG. 18B), where solutions 1 comprises pure electrolyte, solution 2 comprises $Li_2S$ added into solution 1, solution 3 comprises S@NHSC added into solution 2, solution 4 comprises S and NHSC added into solution 2, and solution 5 comprises S added into solution 2; the $N_2$ adsorption/desorption isotherms of NHSC and S@NHSC (FIG. 18C), where insets are the corresponding pore size distributions; the TGA curves of NHSC, S@NHSC, and S in a $N_2$ atmosphere at the heating rate of 10° C. $min^{-1}$ (FIG. 18D); the high-resolution XPS spectra of C (FIG. 18E) 1 s and N (FIG. 18F) 1 s electrons in S@NHSC.
Figure 18B:
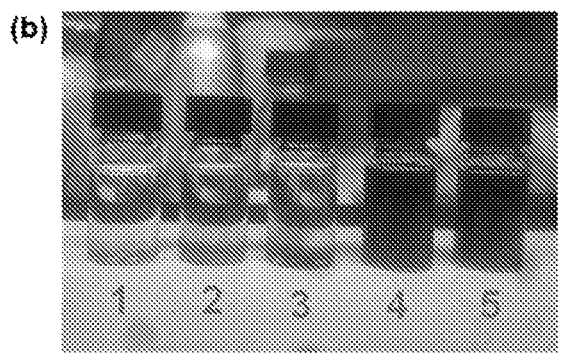
Figure 18C:
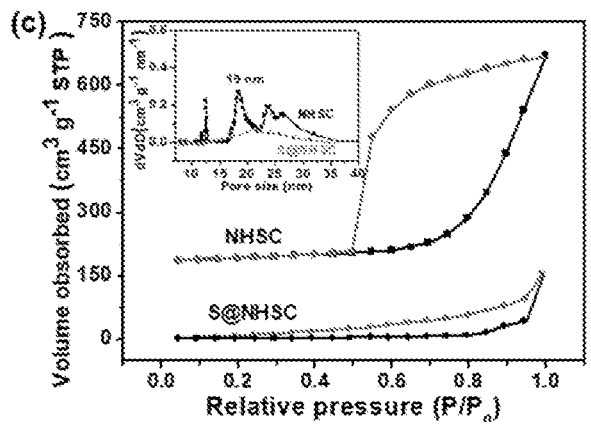
Figure 18D:
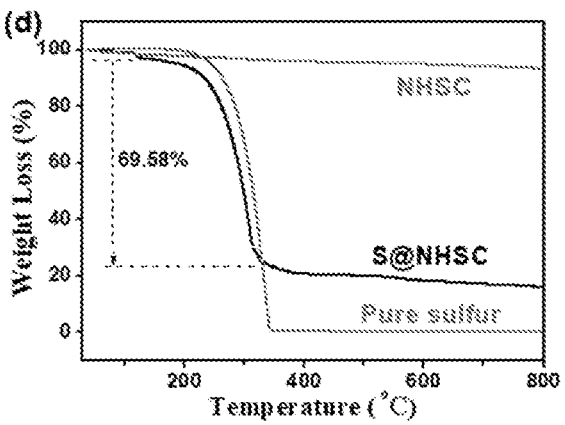

The electrical conductivity of the samples was then evaluated and compared. From the bar graph in FIG. 18A, the electrical conductivity of NHSC was estimated to be 1.20 S cm$^{-1}$, which was only slightly reduced to 1.16 S cm$^{-1}$ after the encapsulation of sulfur into the interior. By contrast, the electrical conductivity of a simple physical mixture of sulfur and NHSC was about two orders of magnitude lower at $5.02 \times 10^{-2}$ S cm$^{-1}$; and pure sulfur exhibited an even poorer electrical conductivity. The encapsulation structure of S@NHSC is further evidenced in visualized diffusion tests. From FIG. 18B, one can see that the pure electrolyte (solution 1) was colorless, and changed to pale yellow after the addition of $Li_2S$ (solution 2), which remained virtually invariant with the further addition of S@NHSC (solution 3). By sharp contrast, when sulfur (and NHSC) was added to solution 2, the solution exhibited a dark brown color (solution 4 and 5), due to the stoichiometric reaction of sulfur with $Li_2S$ to produce $Li_2S_8$. These results indicate effective encapsulation of sulfur in S@NHSC with minimal diffusion. The porosity of the samples was examined by $N_2$ adsorption/desorption measurement. From FIG. 18C, it can be seen that the NHSC sample exhibited an obvious type-W adsorption and desorption isotherm with a sharp capillary condensation step at high relative pressure. This suggests the formation of a mesoporous structure. The Brunauer-Emmett-Teller (BET) surface area and total pore volume were calculated to be 602.57 m$^2$ g$^{-1}$ and 0.92 cm$^3$ g$^{-1}$ for NHSC, and 25.34 m$^2$ g$^{-1}$ and 0.18 cm$^3$ g$^{-1}$ for S@NHSC, respectively (Table 1). Moreover, the pore size distribution based on the Barrett-Joyner-Halenda (BJH) model (inset to FIG. 18C) is centred at ca. 21.23 nm for NHSC and ca. 23.82 nm for S@NHSC. The significant diminishment of the specific surface area of S@NHSC as compared to NHSC is consistent with the impregnation of sulfur into the NHSC interior. The sulfur content in the S@NHSC spheres was then quantified by thermogravimetric (TG) measurements. From FIG. 18D, one can see a weight loss at 200 to 245° C. for pure sulphur, due to the sublimation of sulphur; and S@NHSC exhibited a weight loss of 30.42% around the same temperature range, where only a minimal loss was observed with NHSC, suggesting that sulfur accounted for 69.58 wt. % in S@NHSC.

TABLE 1

Specific surface area, total pore volume and pore diameter of NHSC and S@NHSC.

| Samples | $S_{BET}$ (m$^2$ g$^{-1}$) | Total pore volume (cm$^3$ g$^{-1}$) | pore diameter (nm) |
|---|---|---|---|
| NHSC | 602.57 | 0.92 | 21.23 |
| S@NHSC | 25.34 | 0.18 | 23.82 |

Figure 18E:
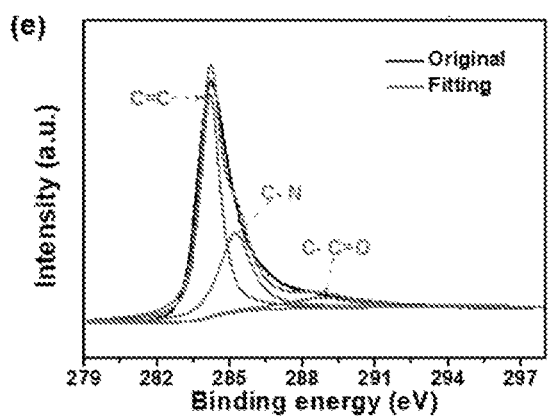
Figure 18F:
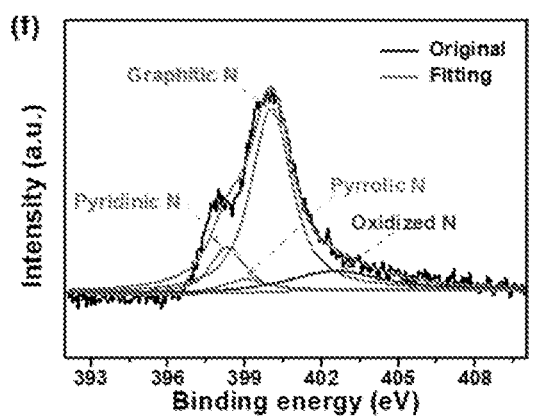

The chemical composition and valence state of S@NHSC was then analyzed by X-ray photoelectron spectroscopy (XPS) measurements. In the XPS survey spectrum of S@NHSC, five peaks emerged at 165.1 eV, 233.6 eV, 284.4 eV, 400.5 eV and 534.1 eV, which can be assigned to the S 2p, S 2S, C 1 s, N 1 s and O 1 s electrons, respectively. Moreover, deconvolution of the high-resolution C is scan yields three peaks at 284.3 eV, 285.4 eV and 288.5 eV that can be ascribed to C—C, O—C—O, and C—N, respectively (FIG. 18E); and pyridinic N (398.2 eV), pyrrolic N (399.5 eV), graphitic N (400.5 eV), and oxidized N (402.4 eV) can be resolved in the N 1 s spectrum (FIG. 18F), suggesting successful nitrogen doping of the carbon scaffolds. Furthermore, the S 2p spectrum can be deconvoluted into two peaks at 164.2 eV and 162.8 eV, corresponding to the $2p_{1/2}$, and S $2p_{3/2}$ electrons of elemental sulfur respectively, consistent with the encapsulation of sulfur into NHSC. Consistent results were obtained in Raman spectroscopy measurements, where three vibration bands can be identified at ca. 480 cm$^{-1}$, 1350 cm$^{-1}$ and 1590 cm$^{-1}$, due to the stretching of S—S bond, disordered sp$^3$ carbon (D band) and graphitic sp$^2$ carbon (G band), respectively.

Figure 20D:
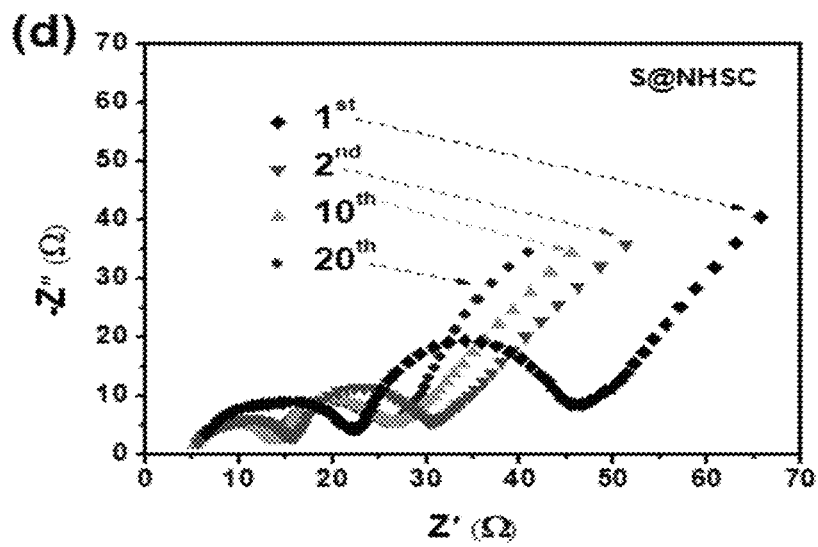
Figure 20E:
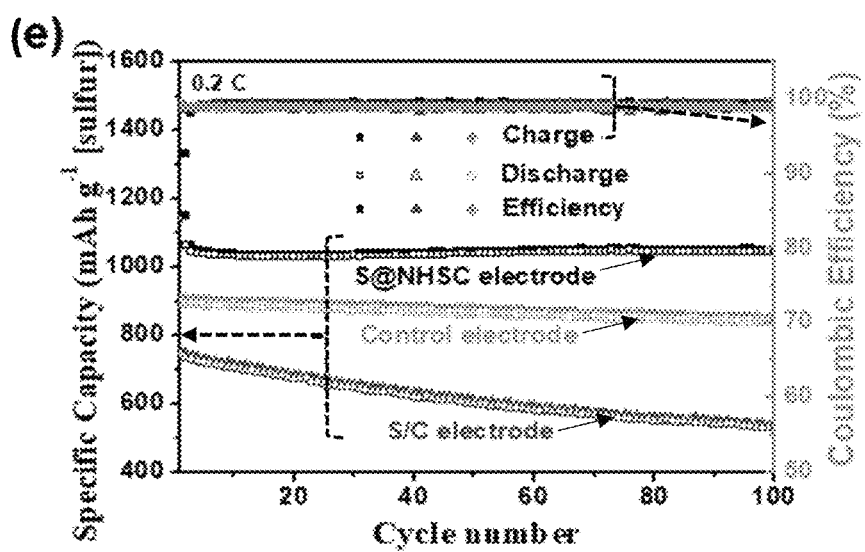
Figure 20F:
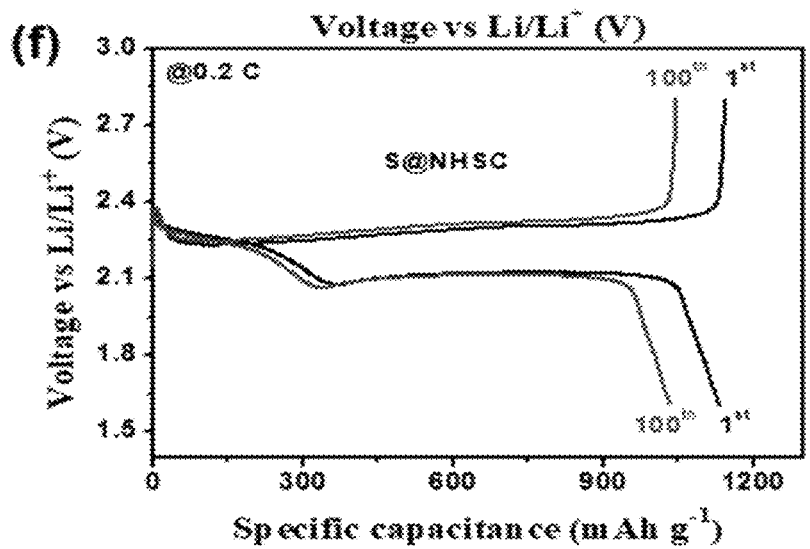
Figure 20G:
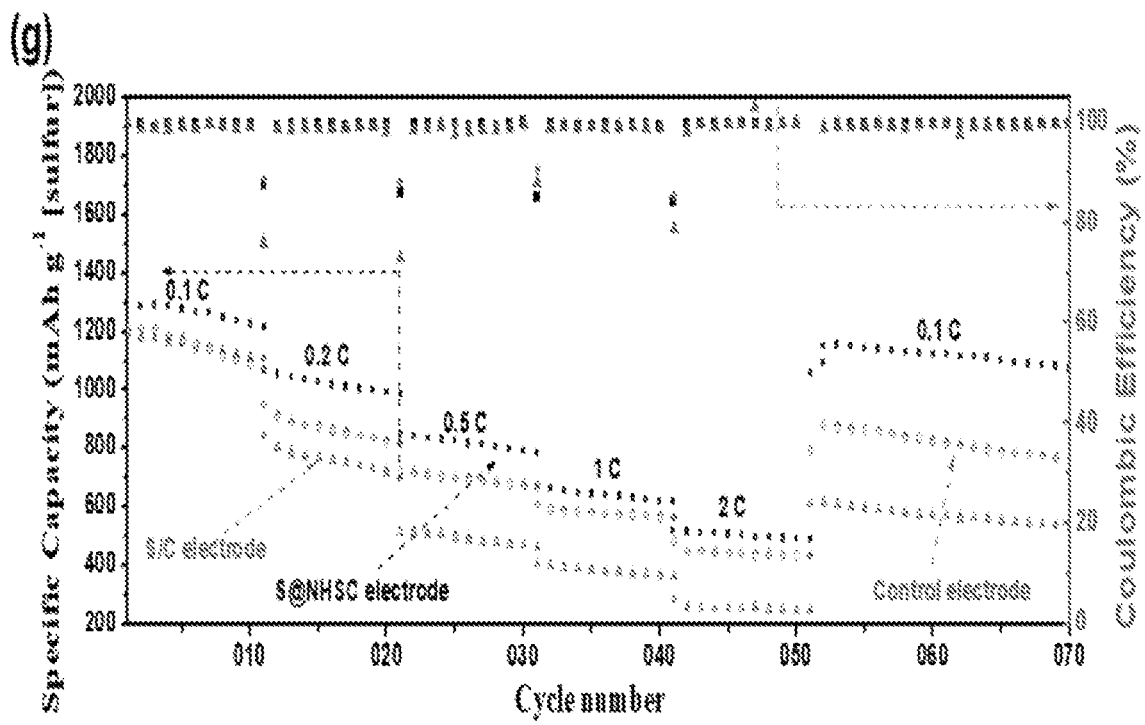
Figure 20H:
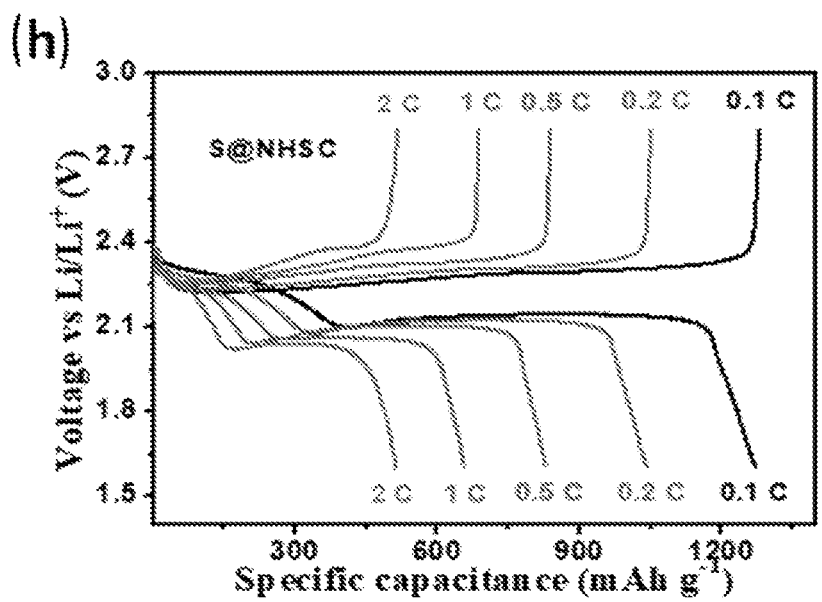
Figure 21:
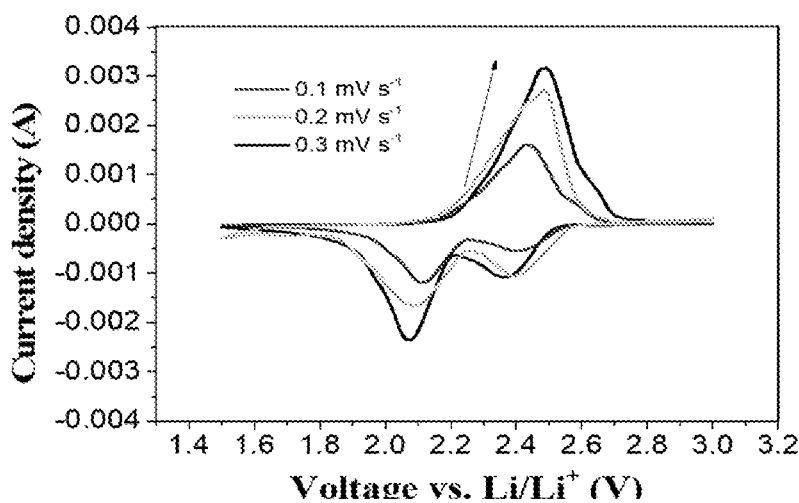
FIG. 21 shows cyclic voltammograms of the S@NHSC electrode at varied scan rates.
Figure 22A:
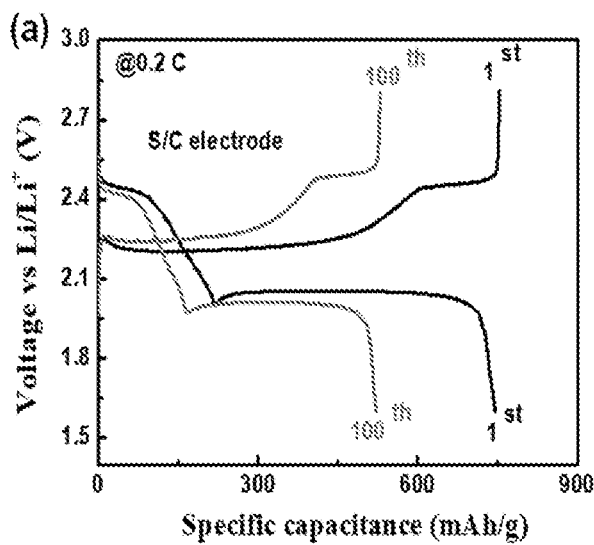
FIGS. 22A and 22B respectively show the galvanostatic charge-discharge profiles of the S/C electrode, and the control electrode with different cycles.
Figure 22B:
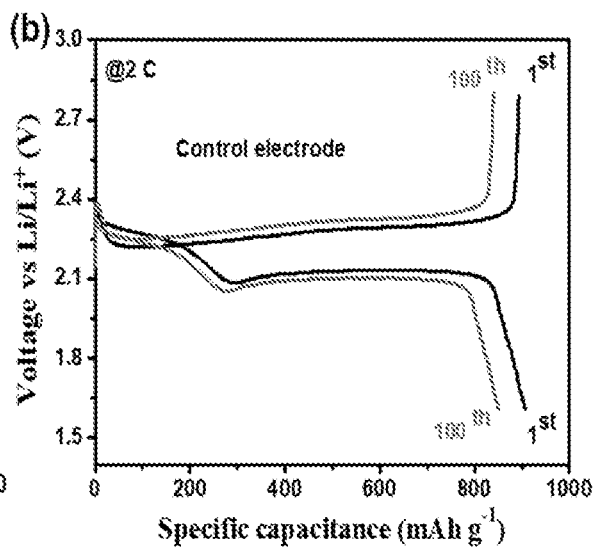
Figure 23:
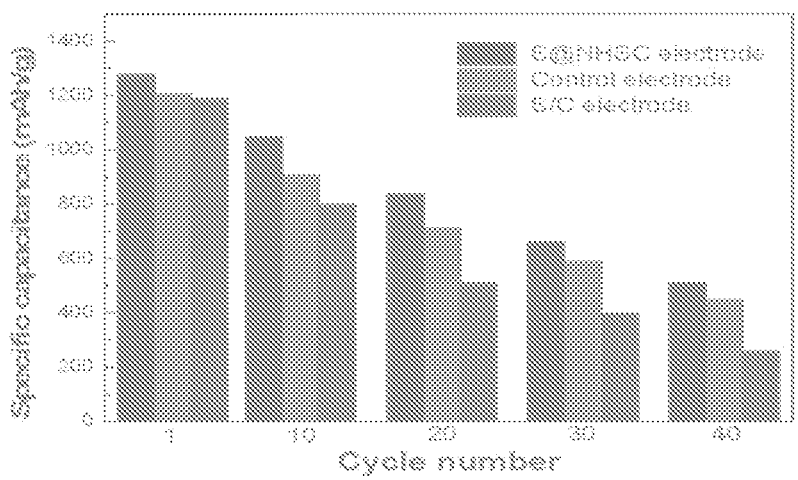
FIG. 23 shows the histogram of discharge capacity of S/C, control and S@NHSC electrodes with different cycle number from 0.1 C to 2 C.

To evaluate the electrochemical properties of the S@NHSC composite for Li—S batteries, the 2016 coin cells with S@NHSC as the cathode were assembled and compared to those constructed with a mixture of S and NHSC as the control electrode. In addition, to demonstrate the practicability of the resultant Li—S batteries, button-type and soft-packaged cells with the S@NHSC electrode were used to light up a "JNU"-shaped array of light-emitting diodes (LEDs) (FIG. 20A). The LEDs were lit up at least 9 hours, which indicates good stability of the batteries. During the discharge process (FIG. 20B), NHSC confined the mobile polysulfide anions ($S_n^{2-}$, 3≤n≤8) inside the carbon spheres, significantly hindered the redox shuttle, and prevented the loss of active materials. FIG. 20C shows a typical cyclic voltammetry (CV) curve of S@NHSC cathode at the scan rate of 0.2 mV s$^{-1}$, where two reduction peaks and one oxidation peak of electrode can be clearly observed. The first reduction peak at ca. 2.39 V corresponds to the conversion of orthorhombic sulfur ($S_8$) into long-chain lithium polysulfides ($Li_2S_n$, 4≤n≤8) and the second reduction peak close to 2.08 V is assigned to further reduction of long-chain lithium polysulfides to short-chain $Li_2S_2$ or $LiS_2$. A broad oxidation peak at 2.48 V is attributed to the reverse of the reduction process. Note that the performance of Li—S cells is closely correlated to the $Li^+$ diffusion coefficient ($D_{Li^+}$) in the cathode, which can be calculated from the CV measurements (FIG. 21) according to the Randles-Sevick equation:

$$I_p=(2.69\times10^5)n^{3/2}AD_{Li^+}^{1/2}v^{1/2}C_{Li^+}$$

Where $I_p$ is the peak current in amperes, n is the number of electron transfer in the reduction, A is the electrode area in $cm^2$, v is the sweep rate in V/s, and $C_{Li^+}$ is the molar concentration of $Li^+$ in the solution in mol $cm^{-3}$. The calculated diffusion coefficient ($D_{Li^+}$) of the S@NHSC electrode for the oxidation peaks was $5.07\times10^{-9}$ $cm^2$ $s^{-2}$, which is much lower than the reported $D_{Li^+}$ ($5.7\times10^{-8}$ $cm^2$ $s^{-2}$) in the literature (X. Xiang, et al., *J. Mater. Chem. A* 2019, 7, 9110-9119.). To further compare the electrochemical kinetics of the S@NHSC cathodes, the electrochemical impedance spectra (EIS) were obtained in the frequency range of $10^{-2}$ to $10^5$ Hz. The Nyquist plots of the fresh electrodes show two semicircles in the high-frequency region and one inclined line at low frequencies, as depicted in FIG. 20D. Note that the semicircular intercept in the high frequency region is related to the charge transfer resistance ($R_{CT}$) at the electrode-electrolyte interface; and the slope of the line in the low frequency region reflects the Warburg impedance, which is related to the diffusion rate of lithium ions in the electrode matrix. The $R_{CT}$ of the S@NHSC cathode is ca. 47Ω in the first cycle, which is significantly smaller than those based on the control electrode, suggesting markedly faster transfer kinetics of lithium ion in the former. After the first activation, $R_{CT}$ diminished to ca. 30Ω in the second cycle, ca. 26.7Ω in the tenth, and ca. 26.9Ω in the twentieth, indicating an increasingly stable cathode-electrolyte interface likely due to sufficient electrolyte accessibility to the S@NHSC cathode and good redistribution of discharge products of $Li_2S$. The cycling stability of the Li—S batteries based on different cathodes at 0.2 C at the same sulfur loading of 2.8 mg $cm^{-2}$ is displayed and compared in FIG. 20E. The discharge specific capacities of the batteries in the first cycling are 747.5 mAh $g^{-1}$ for the S/C electrode, 905.5 mAh $g^{-1}$ for the control electrode, and 1139.2 mAh $g^{-1}$ for the S@NHSC electrode. After 100 cycles, the capacities of the batteries with the S/C electrode and the control electrode dropped to 527.7 mAh $g^{-1}$ and 842.1 mAh $g^{-1}$, respectively, whereas the capacity of the S@NHSC electrode dropped only slightly to 1044.8 mAh $g^{-1}$ (FIG. 20F, and FIGS. 22A-22B). Importantly, the capacity decay of the S@NHSC electrode is significantly lower than that of the S/C electrode and the control electrode. The rate performances of the S/C electrode, the control electrode and the S@NHSC electrode were evaluated from 0.1 C to 2 C, as manifested in FIGS. 20G and 20H. It can be seen that the discharge capacities of S@NHSC electrode are 1280.7 mAh $g^{-1}$, 1047.3 mAh $g^{-1}$, 840.8 mAh $g^{-1}$, 663.4 mAh $g^{-1}$, 515.6 mAh $g^{-1}$ at 0.1 C, 0.2 C, 0.5 C, 1 C and 2 C, respectively. These are significantly higher than those with the S/C electrode, which are 1189.6 mAh $g^{-1}$, 800.2 mAh $g^{-1}$, 513.7 mAh $g^{-1}$, 400.9 mAh $g^{-1}$ and 260.1 mAh $g^{-1}$, and control electrode, which are 1205.8 mAh $g^{-1}$, 910.4 mAh $g^{-1}$, 715.2 mAh $g^{-1}$, 593.5 mAh $g^{-1}$ and 451.7 mAh $g^{-1}$, respectively (FIG. 20G). Moreover, in contrast to the apparent capacity loss of the S/C electrode and the control electrode, the discharge capacity of the S@NHSC electrode could be restored to the first-cycle capacity with the rate current back to 0.1 C, as listed in Table 2 and FIG. 23. This further confirms the exceptional electrochemical stability of the S@NHSC electrode. As used herein, the "S/C electrode" refers to an electrode is prepared by mixing sulfur and carbon materials, and the "control electrode" refers to the electrode is physically prepared by a mixture of sulfur and prepared hollow nitrogen doped carbon material.

TABLE 2

The discharge capacity of S/C, control and S@NHSC electrodes with various current densities from 0.1 C to 2 C.

| Samples electrode | 0.1 C (mAh $g^{-1}$) | 0.2 C (mAh $g^{-1}$) | 0.5 C (mAh $g^{-1}$) | 1 C (mAh $g^{-1}$) | 2 C (mAh $g^{-1}$) | Back to 0.1 C (mAh $g^{-1}$) |
|---|---|---|---|---|---|---|
| S/C | 1189.6 | 800.2 | 513.7 | 400.9 | 260.1 | 613.4 |
| Control | 1205.8 | 910.4 | 715.2 | 593.5 | 451.7 | 761.8 |
| S@NHSC | 1280.7 | 1047.3 | 840.8 | 663.4 | 515.6 | 1153.3 |

Figure 24:
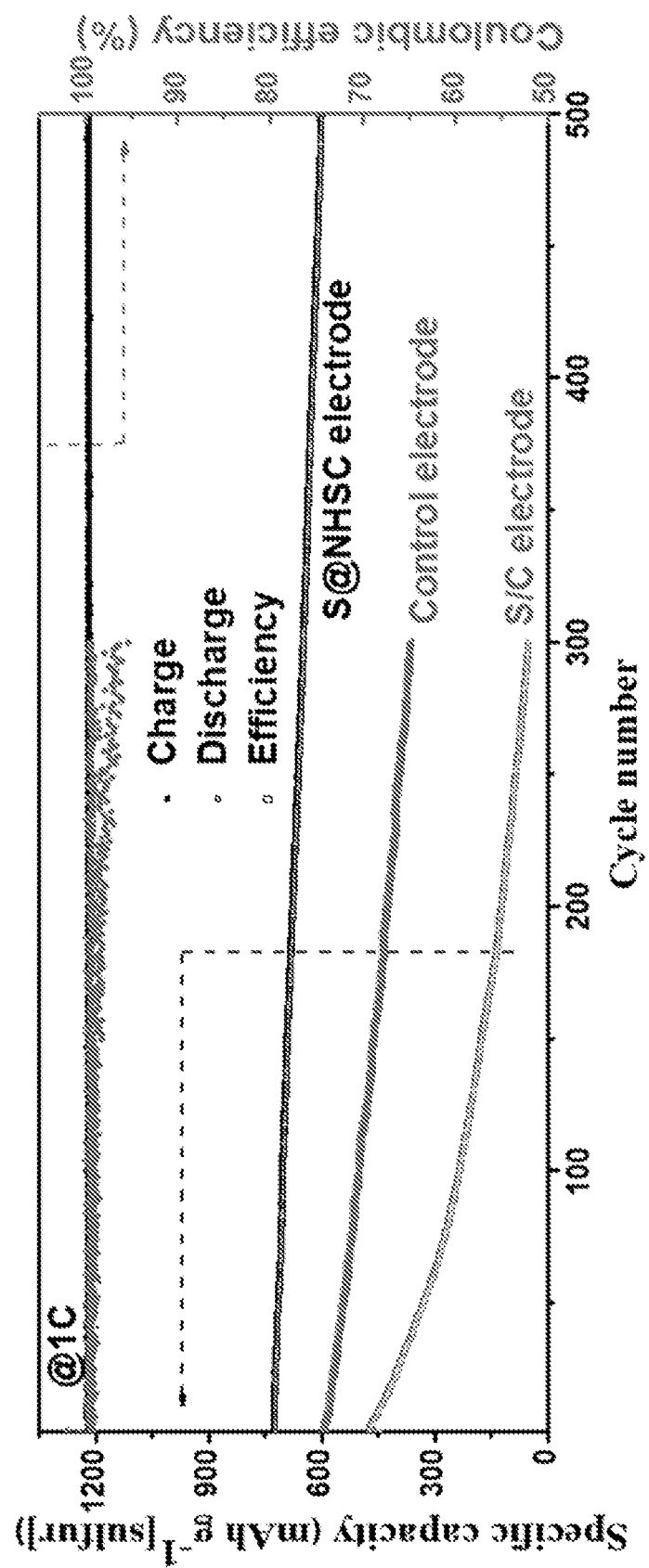
FIG. 24 shows the long-term cycling performances and Coulombic efficiency of the S/C electrode, control electrode and S@NHSC electrode at 1 C for 500 cycles.

The long-term cycling performance of the S/C, control, and S@NHSC electrodes at 1 C is presented in FIG. 24. The initial specific capacity of the batteries was as high as 721.2 mAh $g^{-1}$ and slowly diminished to 598.3 mAh $g^{-1}$ after 500 cycles with a nearly 100% Coulombic efficiency. The capacity decay rate (m) can be calculated by the following equation, $$m = \sqrt[n]{1 - Q_1/Q_2},$$

where $Q_1$ is the last discharge capacity, $Q_2$ is the first discharge capacity, and n is the cycle number. For the S@NHSC electrode, m is very low, at only 0.0373%. By contrast, marked delays of the capacity was observed for the S/C and control electrodes. For instance, after 300 cycles the capacity decreased from 469.3 mAh $g^{-1}$ to 51.5 mAh $g^{-1}$ for the S/C electrode, and from 596.8 mAh $g^{-1}$ to 394.6 mAh $g^{-1}$ for the control electrode. The corresponding m values are 0.733% and 0.137% per cycle, respectively. This indicates that the S@NHSC electrode possessed markedly enhanced cycling stability, as compared to the S/C and control electrodes.

The practical energy density of a Li—S cell is another critical index in applications. The energy density of the whole electrode was calculated according to the following equation (M. Agostini, et al., *Adv. Energy Mater.* 2018, 8, 1801560):

$$E=V\cdot m_A\cdot C/\Sigma W_i$$

Where E is the specific energy density (Wh $kg^{-1}$); V is the average cell operating voltage (V); $m_A$ is the active material loading (g $cm^{-2}$); C is the active material capacity (mAh $g^{-1}$); $W_i$ is the weight of individual cell components (g $cm^{-2}$). The values for the calculation of the practical energy density were shown in Table 3, which shows the parameters of the assembled Li—S cells. It can be seen that the Li—S cell with the S@NHSC cathode shows a practical energy of 373.8 Wh $kg^{-1}$, which is high than those of the Li/LFP cell (250 Wh $kg^{-1}$) and the Li/NMC cell (310 Wh $kg^{-1}$) as reported in the literature (M. Agostini, et al., Adv. Energy Mater. 2018, 8, 1801560). An ideal sulfur host should have the advantageous characteristics of high conductivity for both electron and $Li^+$, and strongly interact with lithium polysulfides. For example, highly conductive carbon nanosheets embedded with ultrafine $CoS_2$ nanoparticles have been used as a sulfur host for Li—S cells; and the cathode show a high specific capacity and good stability over 300 cycles at a high sulfur loading of 3.0 mg $cm^{-2}$. Within this context, one can see that the Li—S cells based on the S@NHSC cathode in the present work showed apparently better cycle stability at the same sulfur loading and rate capability.

TABLE 3

The values of the cell for the calculation of the practical energy density.

| V (V) | $m_A$ (g $cm^{-2}$) | C (mAh $g^{-1}$) | $W_{Celgard}$ (g $cm^{-2}$) | $W_{Lithium}$ (g $cm^{-2}$) | $W_{Electrolyte}$ (g $cm^{-2}$) | $W_{PVDF+NHSC+Super\,P}$ (g $cm^{-2}$) |
|---|---|---|---|---|---|---|
| 2.10 | 2.83 | 1280 | 1.06 | 2.74 | 11.50 | 2.22 |

3. Conclusion

In this study, we demonstrated that hollow spherical carbon shells can serve as an efficient sulfur host for Li—S cells. The NHSC exhibited an interconnected, conductive framework with a porous, hollow spherical structure, that facilitated fast transport of electrons and $Li^+$ and provided a sufficient space for sulfur storage. As the sulphur was encapsulated within the carbon shell, the resulting S@NHSC composite exhibited high electrical conductivity and effective electrocatalysis for the conversion of lithium polysulfides, and thus could be used as the cathode for Li—S batteries. Remarkably, the S@NHSC composite electrode delivered a high initial discharge capacities of 1280.7 mAh $g^{-1}$ and exhibited high cycling stability over 500 cycles with a capacity decay as low as 0.0373% per cycle, in sharp contrast to those based on S/C or simple mixture of S and NHSC.

4. Experimental Section

4.1 Preparation of Hollow Spherical Carbon (NHSC)

NHSC was synthesized by adopting a procedure based on vesicle formation in an oil-in-water mixture. Experimentally, the dopamine hydrochloride (0.3 g), polyethylene-polypropylene glycol F127 (0.45 g molecular weight 13,000) and 1, 3, 5-trimethylbenzene (0.8 mL) were mixed into 10 mL of water and 10 mL of alcohol under magnetic stirring. Then, an ammonium hydroxide solution (25~28 wt. %, 0.7 mL) was added into the above mixture to initiate polymerization. The sediments were collected by centrifugation after the polymerization reaction of ca. 3 h, and washed with a mixture of water and alcohol (v/v=1:1), before being redispersed in the water and alcohol mixture and heated in a sealed Teflon-lined autoclave (50 mL) at 100° C. for 24 h. The obtained solids were then collected and heated at 300° C. for 3 h and further at 800° C. for 2 h at the heating rate of 2° C. $min^{-1}$ under an argon atmosphere.

Preparation of Hollow Spherical Carbon-Coated Sulfur (S@NHSC) Composites

Firstly, sodium thiosulfate (12.5 g $Na_2S_2O_3$; Aladdin) was dissolved in the mixture of 25 mL of water and 25 mL of alcohol under magnetic stirring, into which was added the NHSC obtained above (0.3 g). Secondly, concentrated hydrochloric acid (5 mL HCl; Aladdin) was added to the same solution to form sulfur nanoparticles. The resulting solution was centrifuged at 8,000 rpm for 20 min to isolate the precipitates. Finally, S@NHSC was obtained by heating at 150° C. for 20 min in a $N_2$ flow of 200 mL $min^{-1}$ to remove sulfur on the outside surface of NHSC.

4.2 Preparation of Coin-Cells and Electrochemical Measurements

To fabricate the cathode for Li—S battery, a S@NHSC slurry was prepared by mixing 80 wt. % of the S@NHSC, 10 wt. % of conductive carbon (Super P) and 10 wt. % of polyvinylidene fluoride (PVDF) in N-Methyl pyrrolidone (NMP). The slurry was cast on the surface of an aluminum current collector of 200 μm in thickness. After the slurry was dried, the electrode was cut into small round pieces of 12 mm in diameter. Coin cells were then constructed with the S@NHSC as the cathode, a lithium foil (diameter 12 mm, thickness 0.3 mm, ca. 3.1 mg per disk) as the counter electrode, polyethylene (Celgard 2400, 12 mm; ca. 1.2 mg per piece) as a diaphragm, and 1.0 mol $L^{-1}$ lithium bis (trifluoromethanesulfonyl) imide (LiTFSI) with 0.1 mol $L^{-1}$ of $LiNO_3$ in 1,3-dioxolane and 1,2-dimethoxyethane (v/v=1:1) as the electrolyte (ca. 13 mg per cell). The electrode area was 1.13 $cm^2$ at the sulfur mass loading of around 2.8 mg $cm^{-2}$. The galvanostatic measurements were carried out by using a CT2001A cell test instrument (Wuhan LAND Electronic Co, Ltd 20 mA). The CV and EIS measurements were conducted with a CHI660E (Shanghai CH Instrument Co, Ltd) electrochemical workstation.

4.3 Materials Characterization

The surface morphologies, along with energy-dispersive X-ray spectroscopy (EDS) and elemental mapping analysis, of NHSC and S@NHSC were examined with a scanning electron microscope (SEM, Hitachi S-4800) and transmission electron microscope (TEM, G2 F20FEI Tecnai G2 F20). Thermogravimetric analysis (TGA, METTLER) was performed under a $N_2$ atmosphere at a temperature rate of 10° C. $min^{-1}$. $N_2$ adsorption-desorption isotherms and pore-size distributions were obtained at 87.3 K by using a quadrasorb SIMP apparatus. XPS measurements were performed by using a Phi X-tool XPS instrument. Raman spectra were recorded by using a HORIBA instrument with an Ar laser source of 633 nm as the excitation wavelength in a macroscopic configuration. For electrical measurements, the powder materials were compressed at a pressure of 40 MPa into circular sheets with the same diameter by using a tablet compression machine. The electrical conductivity of the circular sheets was measured by using a KEITHLEY 2636B source-meter based on the two-probe method.

REFERENCES

X. Xiang, J. Y. Wu, Q. X. Shi, Q. Xia, Z. G. Xue, X. L. Xie, Y. S. Ye, *J. Mater. Chem. A* 2019, 7, 9110-9119.

M. Agostini, J. Y. Hwang, H. M. Kim, P. Bruni, S. Brutti, F. Croce, A. Matic, Y. K. Sun, *Adv. Energy Mater.* 2018, 8, 1801560.

M. Agostini, J. Y. Hwang, H. M. Kim, P. Bruni, S. Brutti, F. Croce, A. Matic, Y. K. Sun, *Adv. Energy Mater.* 2018, 8, 1801560.

S Zeng, L Li, L Xie, D Zhao, N Wang, S Chen, *ChemSusChem* 2017, 10, 3378-3386.

The invention claimed is:

1. A method for manufacturing an electrode material comprising a plurality of nanoparticles, each having a diameter of approximately 100-400 nm and comprising a core and a shell encapsulating the core, the method comprising:
   (1) fabricating the shell of each nanoparticle, such that the shell comprises carbon and nitrogen, respectively having a mass fraction of approximately 70-90% and approximately 5-20% relative to a total mass of the shell; and
   (2) encapsulating a core material into the core of each nanoparticle, such that the core material comprises sulfur having a mass fraction of approximately 40-97% relative to a total mass of the core material, and the core material has a mass fraction of approximately 50-90% relative to a total mass of each nanoparticle;
   wherein the step (1) of fabricating the shell of each nanoparticle comprises:
      (a) mixing at least one hydrophilic substance, at least one hydrophobic substance, at least one surfactant, at least one amphiphilic substance to thereby obtain a mixture, such that the at least one hydrophobic substance forms a plurality of vesicles in a medium of the at least one hydrophilic substance in presence of the at least one surfactant, and molecules of the at least one amphiphilic substance self-assemble at a hydrophilic-hydrophobic interface of each vesicle;
      (b) allowing the molecules of the at least one amphiphilic substance self-assembled at the hydrophilic-hydrophobic interface of each vesicle to polymerize, thereby obtaining a plurality of polymerized particles;
      (c) collecting the plurality of polymerized particles, and introducing porosity thereinto; and
      (d) performing a carbonization treatment to the plurality of polymerized particles, thereby obtaining the shell for each of the plurality of nanoparticles;
      wherein:
         one or more of the at least one amphiphilic substance is a nitrogen-containing amphiphilic substance; and
         the at least one hydrophilic substance, the at least one hydrophobic substance, the at least one surfactant, and the at least one amphiphilic substance do not cross-react with one another.

2. The method of claim 1, wherein the nitrogen-containing amphiphilic substance is a dopamine, methacrylate-2-(N,N-dimethylamine) ethyl ester, N-isopropylacrylamide, or 2-(dimethylamino) ethyl ester.

3. The method of claim 1, wherein each of the at least one hydrophilic substance is a polar solvent, selected from a group consisting of water, an alcohol, an aldehyde and a carboxylic acid.

4. The method of claim 1, wherein each of the at least one hydrophobic substance is a nonpolar organic solvent, selected from a group consisting of 1,3,5-trimethylbenzene, benzene, gasoline, chloroform, and ethyl acetate.

5. The method of claim 1, wherein each of the at least one surfactant is selected from a group consisting of polyethylene-polypropylene glycol, ammonium sodium dodecyl sulfate, and dodecyl polyoxyethylene ether sulfate.

6. The method of claim 1, wherein the sub-step (b) comprises:
   mixing an initiator into the mixture, thereby allowing the molecules of the at least one amphiphilic substance self-assembled at the hydrophilic-hydrophobic interface of each vesicle to polymerize to thereby obtain a plurality of polymerized particles, wherein the initiator comprises at least one of ammonium hydroxide, potassium persulfate, sodium persulfate, or oxidant-ammonium peroxydisulfate.

7. The method of claim 1, wherein the sub-step (c) comprises:
   collecting the plurality of polymerized particles;
   washing the plurality of polymerized particles with at least one evaporable substance such that the at least one evaporable substance infiltrates within each of the plurality of polymerized particles; and
   performing a thermal reaction to the washed plurality of polymerized particles, such that evaporation of the at least one evaporable substance within each of the plurality of polymerized particles introduces porosity thereinto.

8. The method of claim 7, wherein the at least one evaporable substance comprises a mixture of water and an alcohol, wherein the thermal reaction is a hydrothermal reaction performed under a temperature of 90-120° C. and lasting for 20-25 hours.

9. The method of claim 1, wherein the carbonization treatment in the sub-step (d) is performed under a temperature of 700-880° C. and lasting for 100-150 min.

10. The method of claim 1, wherein the step (2) is realized through a chemical reaction producing elemental sulfur, comprising:
   mixing the plurality of polymerized particles with substrates of the chemical reaction, such that a solid form of elemental sulfur is formed within the shell of each of the plurality of polymerized particles, wherein the substrates comprise a thiosulfate and an acid, wherein:
      the thiosulfate comprises at least one of sodium thiosulfate, potassium thiosulfate, lithium thiosulfate, or ammonium thiosulfate; and
      the acid comprises at least one of hydrochloric acid or sulphuric acid.

11. The method of claim 1, wherein the step (2) comprises:
   preparing a mixture of the plurality of polymerized particles and a solid form of sulfur;
   heating the mixture such that the solid form of sulfur melts into a molten form and infiltrates into an inside of the plurality of polymerized particles, wherein the heating the mixture is under a temperature of 130-200° C. and for 10-200 min; and
   cooling the mixture and collecting sulfur-infiltrated polymerized particles.

12. The method of claim 1, wherein the step (2) comprises:
   mixing the plurality of polymerized particles with a solution comprising dissolved sulfur, such that the dissolved sulfur flows into an inside of the plurality of polymerized particles;

precipitating a solid sulfur within the inside of the plurality of polymerized particles from the dissolved sulfur.

13. The method of claim 1, wherein the step (2) further comprises:
removing sulfur absorbed on an outer surface of each of the plurality of polymerized particles, realized by a heating treatment, wherein the heating treatment is performed under a temperature of 150-180° C. in a blow of a gas.

* * * * *